US010421582B2

(12) United States Patent
Kilibarda et al.

(10) Patent No.: US 10,421,582 B2
(45) Date of Patent: Sep. 24, 2019

(54) MODULAR RECONFIGURABLE VEHICLE ASSEMBLY PALLET

(71) Applicant: Comau LLC, Southfield, MI (US)

(72) Inventors: Velibor Kilibarda, Southfield, MI (US); Freddie Tappo, Sterling Heights, MI (US)

(73) Assignee: Comau LLC, Southfield, MI (US)

( * ) Notice: Subject to any disclaimer, the term of this patent is extended or adjusted under 35 U.S.C. 154(b) by 0 days.

(21) Appl. No.: 15/927,160

(22) Filed: Mar. 21, 2018

(65) Prior Publication Data

US 2018/0273243 A1 Sep. 27, 2018

Related U.S. Application Data

(60) Provisional application No. 62/474,824, filed on Mar. 22, 2017.

(51) Int. Cl.
| | |
|---|---|
| *B65D 19/44* | (2006.01) |
| *B65D 19/00* | (2006.01) |
| *B65D 19/08* | (2006.01) |
| *B62D 65/18* | (2006.01) |
| *B62D 65/02* | (2006.01) |
| *B23K 37/04* | (2006.01) |
| *B23K 37/047* | (2006.01) |

(Continued)

(52) U.S. Cl.
CPC .............. *B65D 19/44* (2013.01); *B23K 31/02* (2013.01); *B23K 37/047* (2013.01); *B23K 37/0426* (2013.01); *B62D 65/022* (2013.01); *B62D 65/18* (2013.01); *B65D 19/0095* (2013.01); *B65D 19/08* (2013.01); *B23K 2101/006* (2018.08); *B23P 2700/50* (2013.01); *B65D 2519/00293* (2013.01); *B65D 2519/00572* (2013.01); *B65D 2519/00582* (2013.01); *B65D 2519/00815* (2013.01)

(58) Field of Classification Search
CPC .......... B65D 19/44; B65D 2519/00915; B62D 65/022; B62D 65/18; B25J 9/023; B60P 1/64; B60P 7/10; B60P 7/13
USPC ................... 108/55.1, 55.3; 410/46; 414/589
See application file for complete search history.

(56) References Cited

U.S. PATENT DOCUMENTS

| | | | | |
|---|---|---|---|---|
| 2,828,931 A | * | 4/1958 | Harvey | .............. B65D 19/0095 108/54.1 |
| 4,911,084 A | * | 3/1990 | Sato | ........................ B65D 19/38 108/55.1 |

(Continued)

FOREIGN PATENT DOCUMENTS

| | | |
|---|---|---|
| FR | 2384229 A1 | 10/1978 |
| JP | H05277848 A | 10/1993 |

*Primary Examiner* — Jose V Chen
(74) *Attorney, Agent, or Firm* — Young Basile Hanlon & MacFarlane, P.C.

(57) ABSTRACT

A modular reconfigurable vehicle assembly pallet system and method are disclosed. In one example, a plurality of modular assembly plates are assembled having vehicle locators positioned specifically for a particular model vehicle. The assembled vehicle-specific plates are easily installed on a universal pallet positioned along an assembly line in an assembly sequence. The vehicle-specific modular plates can be quickly interchanged on the assembly pallet to thereby reconfigure the assembly pallet to coordinate with changing vehicle build assembly sequences.

19 Claims, 19 Drawing Sheets

(51) Int. Cl.
*B23K 31/02* (2006.01)
*B23K 101/00* (2006.01)

(56) References Cited

U.S. PATENT DOCUMENTS

| | | | | |
|---|---|---|---|---|
| 4,977,836 A * | 12/1990 | Bond | ................ | B65D 19/44 |
| | | | | 108/55.1 |
| 5,180,134 A * | 1/1993 | Mallak | ................ | B65G 7/02 |
| | | | | 108/55.1 |
| 5,735,219 A * | 4/1998 | Kirker | ................ | B23Q 7/14 |
| | | | | 108/54.1 |
| 7,044,066 B1 * | 5/2006 | Miller | ................ | B65D 19/44 |
| | | | | 108/54.1 |
| 7,077,067 B2 * | 7/2006 | Bodde | ................ | B65D 19/44 |
| | | | | 108/55.1 |
| 7,080,600 B2 * | 7/2006 | Jurdens | ................ | B65D 19/44 |
| | | | | 108/53.1 |
| 7,555,879 B1 * | 7/2009 | Utz | ................ | B65D 19/0095 |
| | | | | 108/56.3 |
| 8,425,165 B2 * | 4/2013 | Harada | ................ | B65D 19/0026 |
| | | | | 410/46 |
| 8,839,507 B2 | 9/2014 | Kilibarda et al. | | |
| 8,925,470 B2 * | 1/2015 | Hart | ................ | F16M 3/00 |
| | | | | 108/55.1 |
| 9,533,725 B2 | 1/2017 | Bellezza | | |
| 10,040,579 B1 * | 8/2018 | Henderson | ................ | B65D 85/68 |
| 2003/0141207 A1 * | 7/2003 | Pai | ................ | B65D 19/0026 |
| | | | | 206/335 |
| 2009/0266275 A1 * | 10/2009 | Feeney | ................ | B65D 19/44 |
| | | | | 108/55.1 |
| 2010/0116505 A1 * | 5/2010 | Clark | ................ | E21B 33/0355 |
| | | | | 166/338 |
| 2011/0303661 A1 * | 12/2011 | Tujague, Sr. | ................ | B65D 88/526 |
| | | | | 220/23.88 |
| 2012/0030924 A1 | 2/2012 | Kilibarda et al. | | |
| 2014/0076761 A1 * | 3/2014 | Hellweg | ................ | B65G 1/02 |
| | | | | 206/386 |
| 2014/0090581 A1 * | 4/2014 | Schultz | ................ | F16F 15/067 |
| | | | | 108/57.12 |
| 2014/0360552 A1 * | 12/2014 | Britcher | ................ | H02S 20/00 |
| | | | | 136/244 |
| 2018/0162591 A1 * | 6/2018 | Porter | ................ | B65D 19/44 |
| 2018/0265249 A1 * | 9/2018 | Grutt | ................ | B65D 19/44 |

\* cited by examiner

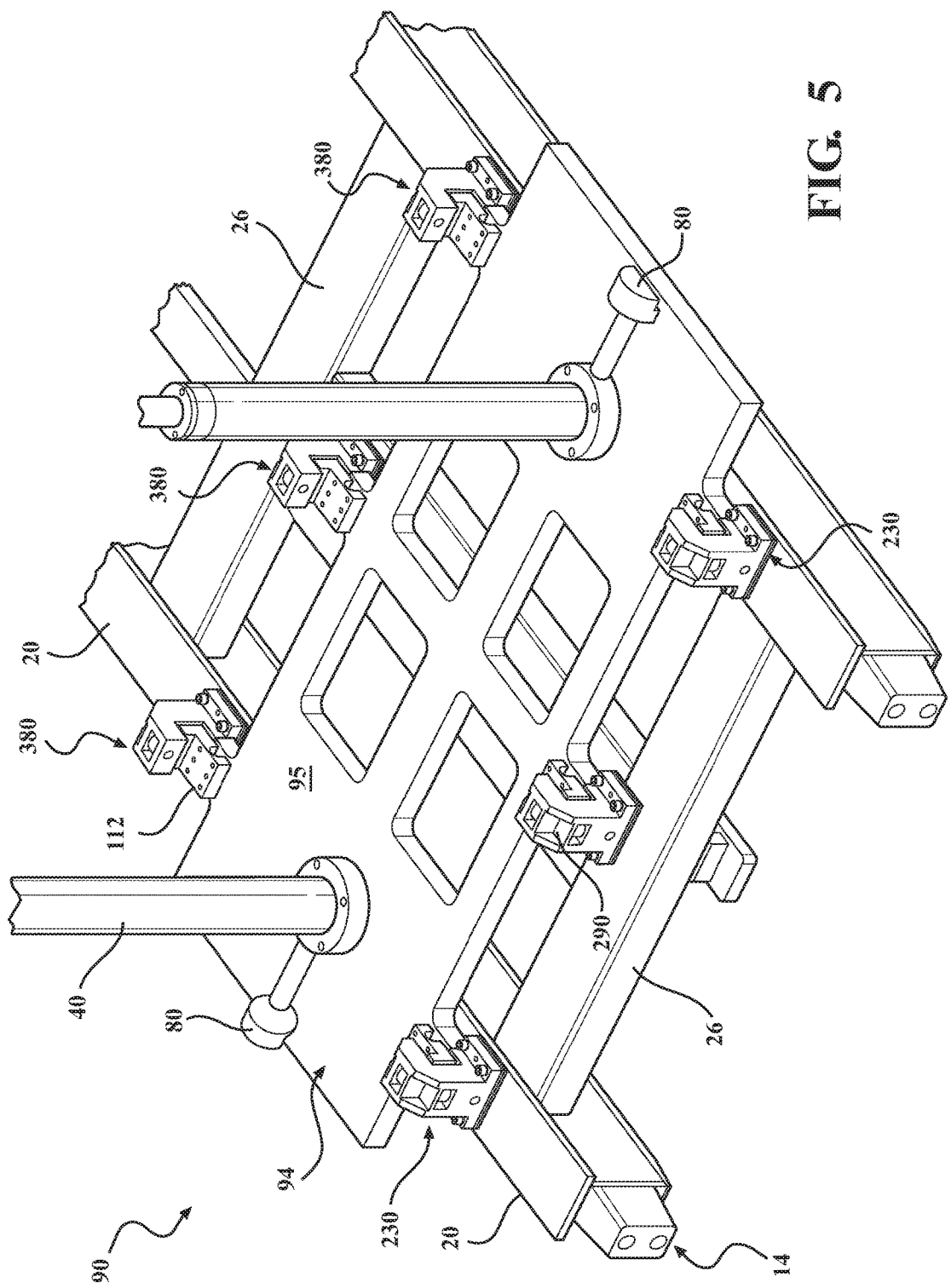

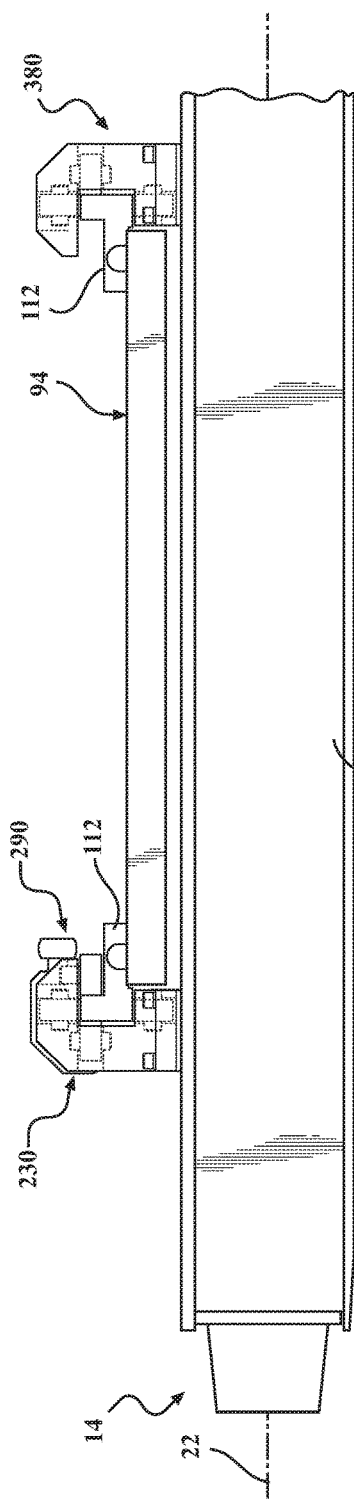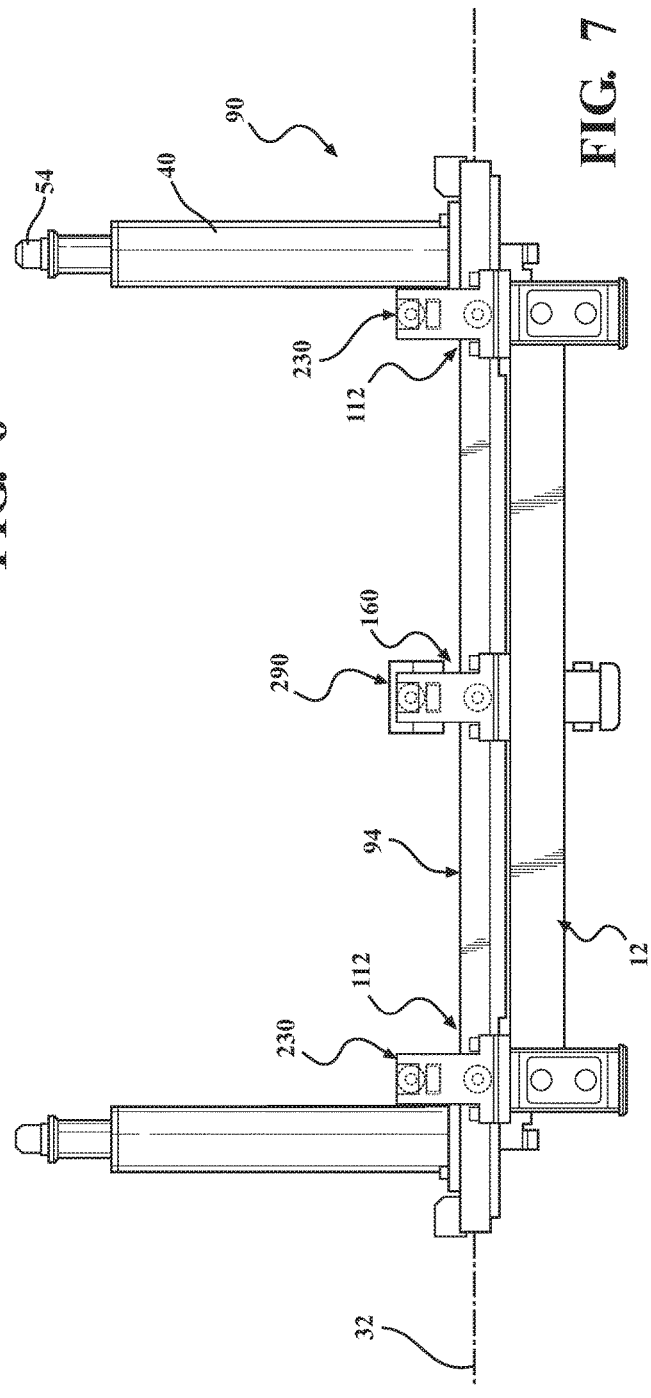

MODULAR RECONFIGURABLE VEHICLE ASSEMBLY PALLET

CROSS-REFERENCE TO RELATED APPLICATIONS

This application claims priority benefit to U.S. Provisional Patent Application No. 62/474,824 filed Mar. 22, 2017 the entire contents of which is incorporated herein by reference.

TECHNICAL FIELD

This disclosure generally relates to assembly of machines or products.

BACKGROUND

Referring to FIG. 1, an example of a conventional pallet system 10 used to support a partially completed vehicle, for example a sheet metal body of a passenger vehicle (not shown) is illustrated. The pallets 10 supported the partial vehicle bodies and are transferred in sequential fashion by a conveyor (not shown) through numerous assembly stations (not shown), for example spot welding and brazing stations, along an assembly line.

In conventional pallets systems 10, a pallet 12 typically included a pair of longitudinal rails 20 oriented along a longitudinal axis 22 (the X coordinate direction) and defining a first end 14 and a second end 16 of the pallet. Crossmembers 26 spanned laterally between the rails 20 along a lateral axis 32 (the Y coordinate direction) defining a rigid pallet structure.

In order to elevate and support the vehicle body, several support beams 30 would be positioned across the rails 20, each support beam 30 including a pair of risers 40 extending vertically along a vertical axis 44 (the Z coordinate direction) as generally shown (four support beams and a total of eight risers 40 shown in FIG. 1 as an example). The number of support beams 30 and risers 40, and position of the support beams 30 and risers 40 depend on the size, length and width of the vehicle body and automotive manufacturer specifications. Although each support beam 30 shows use of two risers 40 per support beam, it is understood that one riser 40, or more than two risers 40 per support beam 30 may be used depending on the application.

As best seen in FIG. 1A, conventional pallet 12 support beams 30 included precision machined locating pads 34 for receipt and mounting of a riser 40 thereon. Risers 40 include a base 46 and several mounting bolts 50 (four shown) for securing each riser 40 to the support beam 30 preventing relative movement between the riser 40 and the support beam 30. An additional locking bolt or dowel 60 (two shown) would be inserted into a predrilled hole through the base 46 and into the support beam 30 to lock the riser 40 in a predetermined position which was an improvement in positional accuracy and repeatability over prior designs. Each riser 40 would include a locating pin 54 (shown in FIG. 1) which would be positioned to engage the vehicle body at predetermined positions on the vehicle body and securely hold the vehicle body in place throughout the various assembly processes.

In vehicle pallet systems, it is of critical importance that the locating pins 54 are positioned accurately and precisely in all three coordinate dimensions X, Y and Z so as to position the vehicle body in known dimensional positions relative to the pallet 12 and the various assembly stations so that precision equipment, for example programmable industrial robots, can carry out various operations on the vehicle body. Current industry dimensional tolerance standards require the locating pins 54 to be within 0.1-0.13 millimeters (mm) from a predetermined design position.

Conventional pallet systems 10 also included a hook and armature linkage inside the risers 40 and locating pins 54 along with actuators 80 positioned on the support beam 30. On rotation of an actuator arm (not shown) at the actuator 80, a linkage 64 positioned across the support beam 30 and inside the hollow riser 40 would manipulate a hook (not shown) positioned inside the hollow locating pin 54 to extend the hook, engage the vehicle body and lock the vehicle body to the riser preventing relative movement of the vehicle body from the risers until the actuator 80 is moved to retract and disengage the hook. An example of a suitable actuator 80 and hook system is described in U.S. Pat. No. 8,839,507 assigned to the present Applicant, the entire contents of which is incorporated herein by reference.

Early prior pallet systems 10 rigidly fixed, for example welded, each support beam 30 and onboard risers 40 to the rails 20 to prevent relative movement of the risers and locating pins 54 from their fixed positions. Due to the many different sizes, lengths and shapes of vehicle bodies, early prior pallet systems 10 could only be used for one vehicle due to the pallet 12's fixed position of the support beams 30, risers 40 and locating pins 54.

In more recent years, an improved pallet design allowed movement of one support beam 30 along the longitudinal axis 22 of rails 20. This would allow a pallet 12 to move one set of risers to a different longitudinal axis 22 (X dimension) in order to accommodate a different vehicle body that had one set of holes in the sheet metal in a different longitudinal position so the pallet could accommodate the vehicle body different hole pattern. However, these improved pallets were only useful for another vehicle body if the same size/diameter riser locator pins 54 were used for both vehicles which also varies from vehicle body model to model. Thus, this improved pallet was also limited in its flexibility to accommodate different vehicle body models and changes in the model production sequence.

In modern vehicle assembly facilities, it is desirable and increasingly common to vary the type or model of vehicles that are assembled along an assembly line. The ability for a manufacturer to change the vehicle styles or bodies being manufactured is highly desirable to meet customer demand for popular vehicle types. In prior assembly facilities, on a vehicle model or style changeover, much of the assembly line equipment and fixtures, for example vehicle pallets 12, would need to be changed to accommodate the new vehicle build. Due to the fixed geometry of prior pallets 12, support beams 30, and risers 40, the entire pallets 12 would need to be removed from the production line and stored or racked until the vehicle production schedule returns to that vehicle style. Typical vehicle pallets 12 are each 5 meters (m)(16.4 feet) long, 1.2 meters (m) (3.9 feet (ft.) wide, and weigh approximately 500 kilograms (kg)(1100 pounds (lb). Thus, movement of the pallets 12 from the assembly line and storage requires heavy equipment and substantial storage space at the assembly facility.

There is a need for an improved vehicle assembly pallet which provides flexibility to rapidly accommodate different vehicle body styles and which maintains the necessary accuracy and precision required of modern vehicle assembly systems.

SUMMARY

Disclosed and illustrated herein is an example of a modular reconfigurable vehicle or product assembly pallet which allows a manufacturer to quickly change the configuration of the assembly pallet to accommodate different products or vehicle models, for example a first vehicle model or body style or a second vehicle model or body style.

In a preferred example, one or more of the fixed support beams and onboard risers are replaced with a removable, modular plate which includes precision, pre-mounted risers specific to a vehicle body style. The vehicle-specific modular plate is selectively positioned on the pallet and removably secured to the pallet thereby accurately and precisely positioning the onboard risers and locator pins in the proper and predetermined location for that vehicle body or model style.

If a change to the configuration of the pallet is needed to accommodate a different vehicle body style or product, the modular plate is disengaged from the pallet, removed from the pallet by an industrial robot or other equipment and replaced with a different modular plate having the proper configuration and placement of the risers and riser locator members or pins for the new body style or product. The removed modular plate(s) can be stored adjacent to the assembly line, for example in racks, for rapid deployment or transferred to a storage area in the assembly facility until needed.

In one example of a modular reconfigurable pallet, the modular plate includes plate locators connected to the plate which removably engage respective receivers on the pallet to properly position and lockingly engage the modular plates to the pallet to thereby position the riser locator members or pins in highly accurate and precise positions for use.

In another example where there a high frequency of pallet reconfiguration is necessary, industrial robots can be positioned on both sides of the assembly line and rapidly change the modular plates as needed to support assembly operations and model changeover.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is an enlarged view of the modular plate of FIG. 4 in an installed position on the pallet;

FIG. 6 is a right-side view of the installed modular plate in FIG. 5 (shown without the risers or actuator components);

FIG. 7 is an end view of the installed modular plate in FIG. 5;

DETAILED DESCRIPTION

Figure 1:
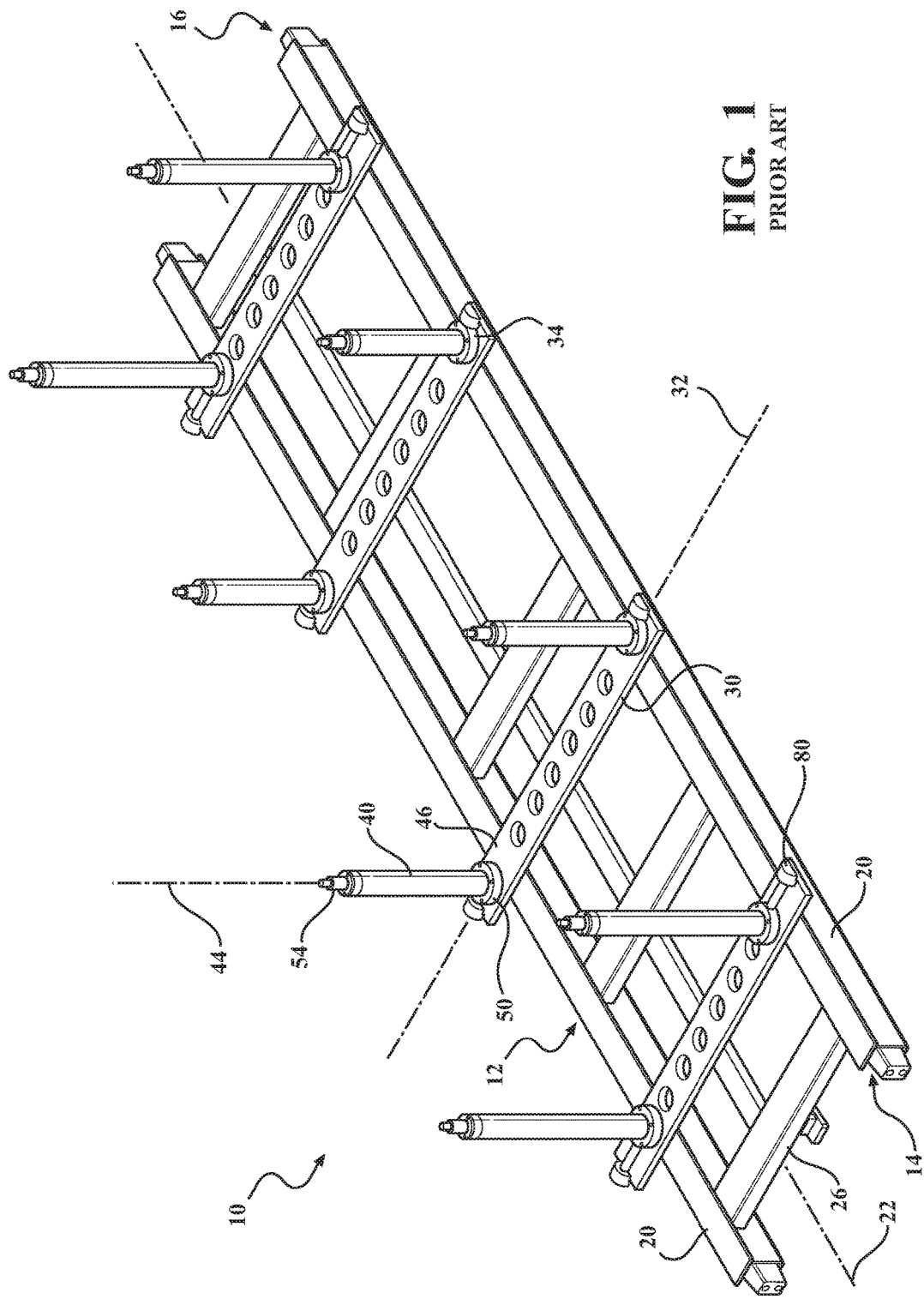
FIG. 1 is a perspective view of a prior art vehicle assembly pallet.
Figure 1A:
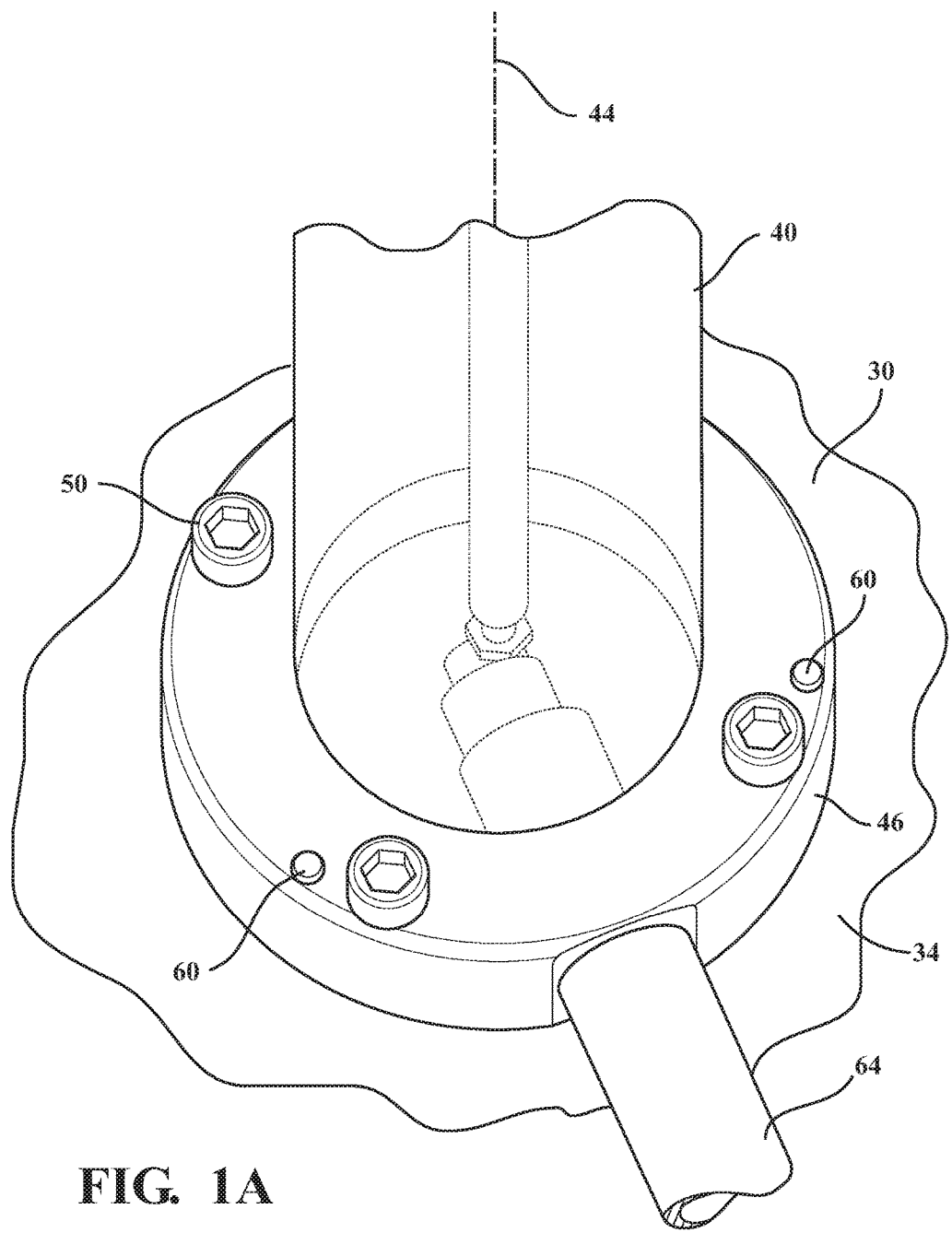
FIG. 1A is a partial perspective view showing a prior art riser base and hardware to secure the riser to a support beam.

Referring to FIGS. 1 and 1A for background of prior pallet 12 structures and FIGS. 2-20 for examples of the present invention, a modular reconfigurable vehicle assembly pallet 90 and method 500 is shown. Where like components are discussed, the same numbers from FIGS. 1 and 1A are used.

Figure 2:
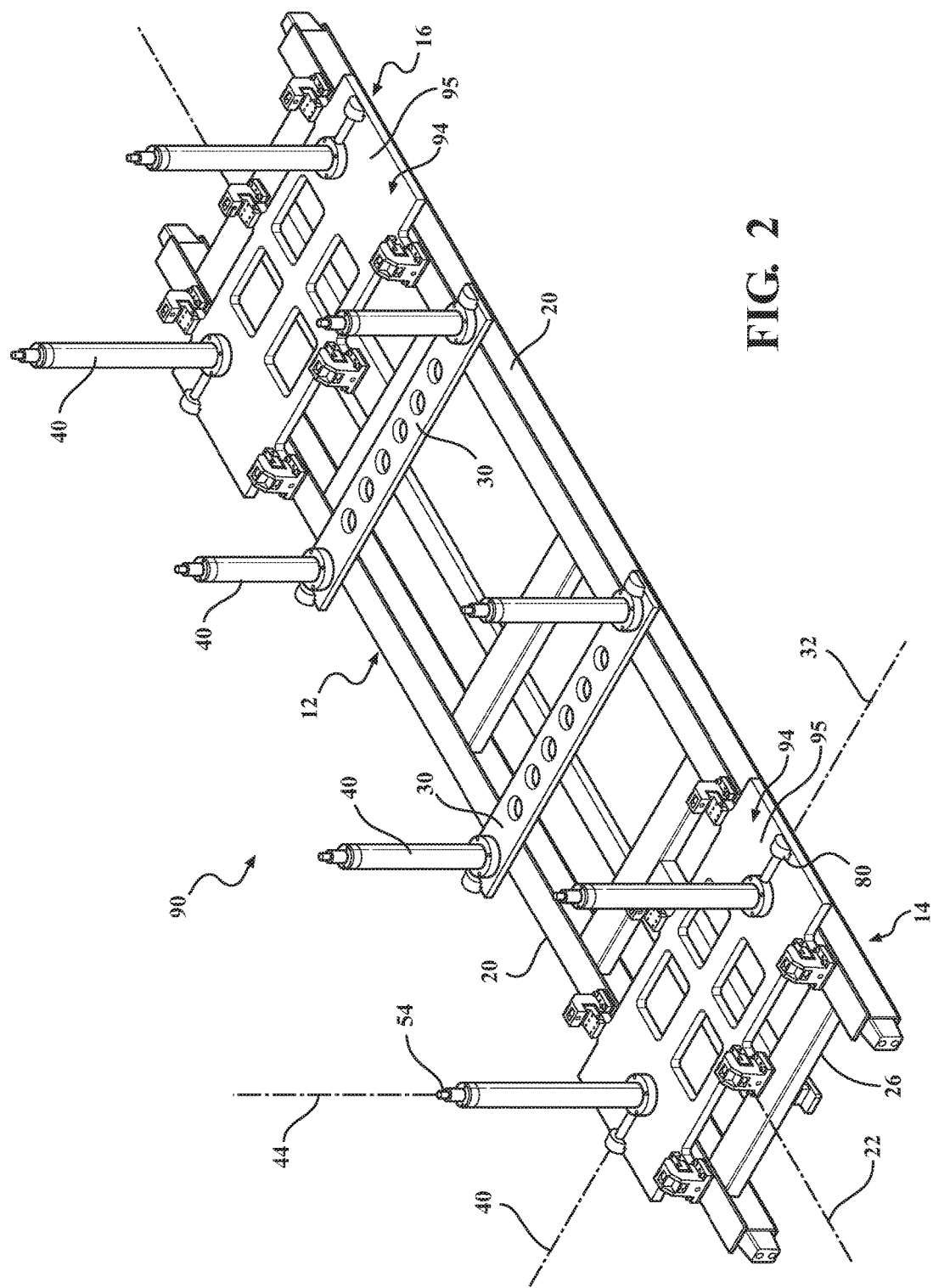
FIG. 2 is a perspective view of an example of a modular reconfigurable pallet of the present invention.
Figure 3:
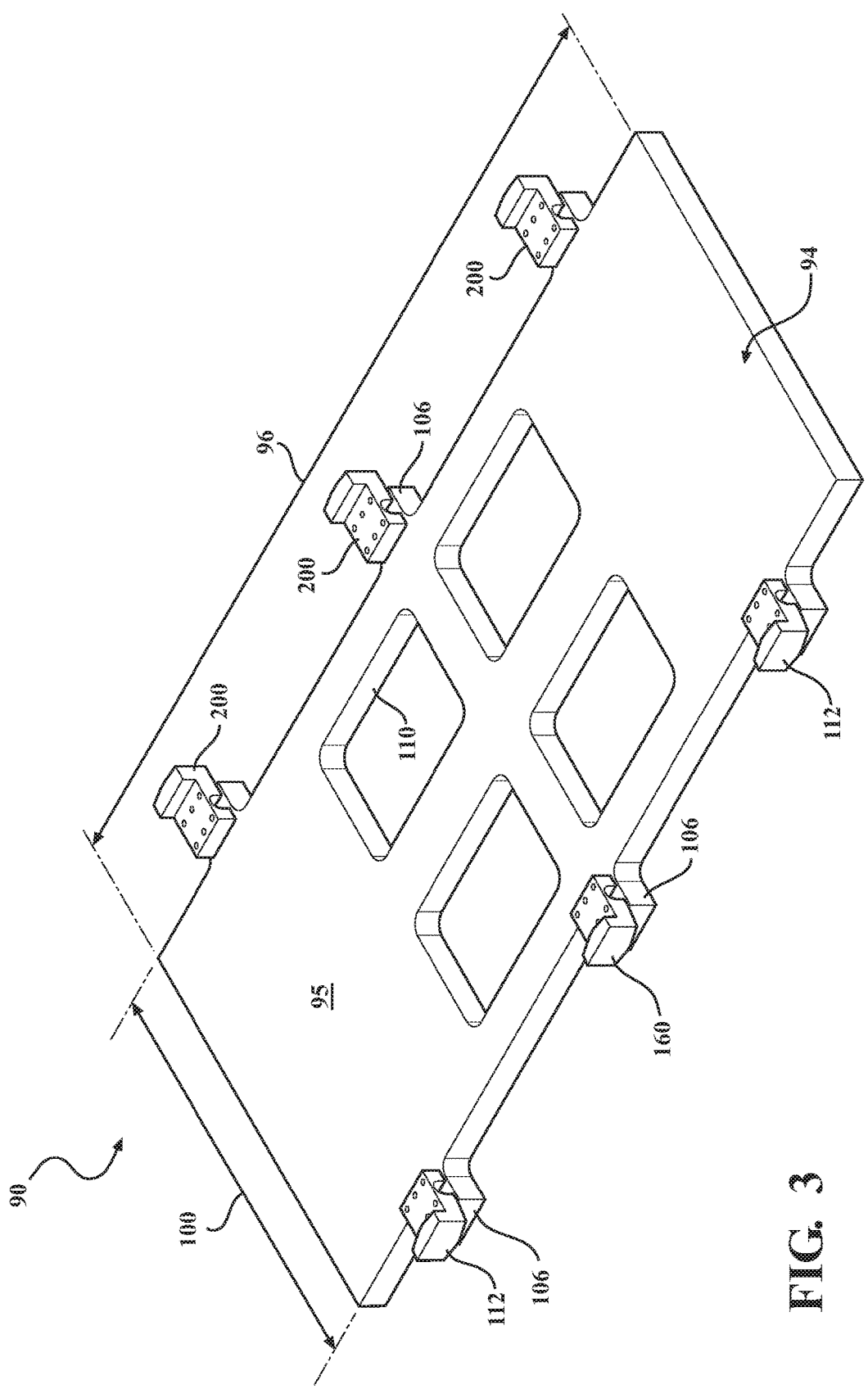
FIG. 3 is a perspective view of an example of a modular riser plate in FIG. 1 without risers.

Referring to FIGS. 2 and 3, an example of the modular reconfigurable assembly pallet system 90 is shown. In the example shown in FIG. 2, two modular plates 94 with respective risers 40 and locating pins 54 are positioned and secured on modular plate 94 as generally shown. The example modular pallet system 90 shows two modular plates 94 and two additional fixed support beams 30 and respective risers 40 as generally shown. It is understood that pallet 90 can include more or fewer modular plates 94, support beams 30 and/or risers 40 depending on the vehicle model being assembled, for example a first product or vehicle model and a second vehicle model, and the associated build specifications. In one example (not shown), no fixed support beams 30 are used and all of the risers 40 are provided by modular plates 94.

In an alternate example (not shown) only one riser 40, or more than two risers 40, for each modular plate 94 may be used depending on the vehicle body configuration and assembly specifications may be used. It is further understood that locating pins 54 may take forms or constructions other than pointed cone structures as described and illustrated to engage one or more features of a partially completed vehicle or other product being assembled as understood by those skilled in the art. In a preferred example, pointed, cone shaped locating pins 54 are used to engage a hole in a sheet metal vehicle body component. It is further understood that risers 40 may take other forms other than the elongate risers having a body extending along the Z axis or coordinate direction 44 with the locating pins 54 at an apex of the riser 40. For example, risers 40 may take many other forms, sizes, shapes, lengths and configurations suitable to position the locating pins 54 (or other physical product or vehicle positioning structure) to accommodate the product or vehicle feature to engage and/or position the product or vehicle in a predetermined X (22), Y (40) and Z (44) geometric coordinate directions or position.

In a preferred example, pallet 12 is a common or universal constructed pallet which remains the same construction, or substantially the same construction, regardless of the modular plates 94 configured for specific products or vehicle models that are used with the pallet 12. It is understood that the pallet 12 can also vary in its construction and configuration without deviating from the present invention. It is further understood that base or pallet 12, including rails 12, crossmembers 26 and other structures can be of different components, configurations, orientations, dimensions, and geometry than described and illustrated herein in order to suit the application without deviating from the present invention. It is further understood that although described for assembly of passenger vehicles, the present invention 90 can be used to assemble other products and devices other than passenger vehicles where model change flexibility and high accuracy and precision of assembly are needed. In one example, a plurality of first modular plates 94 are constructed and configured to engage and position an assembly sequence of first vehicle models and a plurality of second modular plates 94 are constructed and configured to engage and position an assembly sequence of second vehicle models. For example, the risers 40 for the second modular plates 94 may be spaced further from each other along the X coordinate direction 22, and other risers 40, then the first modular plate 94, where the second vehicle model has a longer wheelbase than the first vehicle model.

Referring to FIG. 3 an example of a modular plate 94 for use with the reconfigurable pallet 90 is shown (without risers 40). In the example, modular plate 94 includes a substantially planar plate 95 having a length 96 and width 100 as generally shown. In one example, length 96 is about 800 millimeters (mm) and the width 100 is about 200 millimeters (mm). In one example, plate 95 is a sheet of aluminum having a thickness of 20 to 50 millimeters (mm). Other widths, lengths, thicknesses, and materials may be used to suit the particular application and performance specifications.

As described above, in a preferred example, modular plate 94 is preassembled with a plate 95 including a pair of risers 40 having riser locating members, for example locating pins 54, secured to plate 95 at machined locating pads 34 on the upper surface of plate 95. In a preferred example, the respective locating pads 34 and risers are positioned in predetermined X (22) and Y (32) coordinate locations on the plate 95 for a specific vehicle model or style, for example a first vehicle model and a second vehicle model. The locating pads 34 and risers 40 can be positioned anywhere along the plate 95 in the longitudinal axis 22 (X coordinate direction) and lateral axis 32 (Y coordinate direction) to suit the particular vehicle model application with a high level of precision and accuracy, for example +/−0.1-0.13 millimeters (mm). Other higher or lower levels of accuracy may be used depending on the application or performance specification.

In one example, the risers 40 are oriented on the locating pad 34 so that the centerline of the riser locating member or pin 54 is positioned in a predetermined design location relative to the plate, for example through use of a coordinate measuring machine (CMM). For example, a first modular plate 94 is configured with risers positioned on plate 95 in positions and/or spacing to specifically coordinate and engage with the first vehicle model once the plate 95 is installed on universal pallet 12. Similarly, a second modular plate 94 would be configured with risers to coordinate and engage with the second vehicle model once the plate is installed on universal pallet 12. Once positioned, the mounting bolts 50 and locking dowel 60 are secured rigidly mounting the riser 40 to the plate 95 as previously described thereby positioning the locating pin 54 in the proper design coordinate X, Y and Z positions on installation with universal pallet 12 for that specific vehicle model.

In the example shown in FIG. 3, modular plate 94 includes a plurality of support pads 106 (six shown) extending outward along the X coordinate direction 22. In the example, support pads 106 are integral with plate 95. Other devices, sizes, shapes and configurations may be used. In the example, four large through apertures 110 are shown in plate 95 which may be used to reduce the weight of the modular plate. Apertures 110 can include different numbers and configurations, or could be eliminated from use where weight reduction is not necessary.

Figure 4:
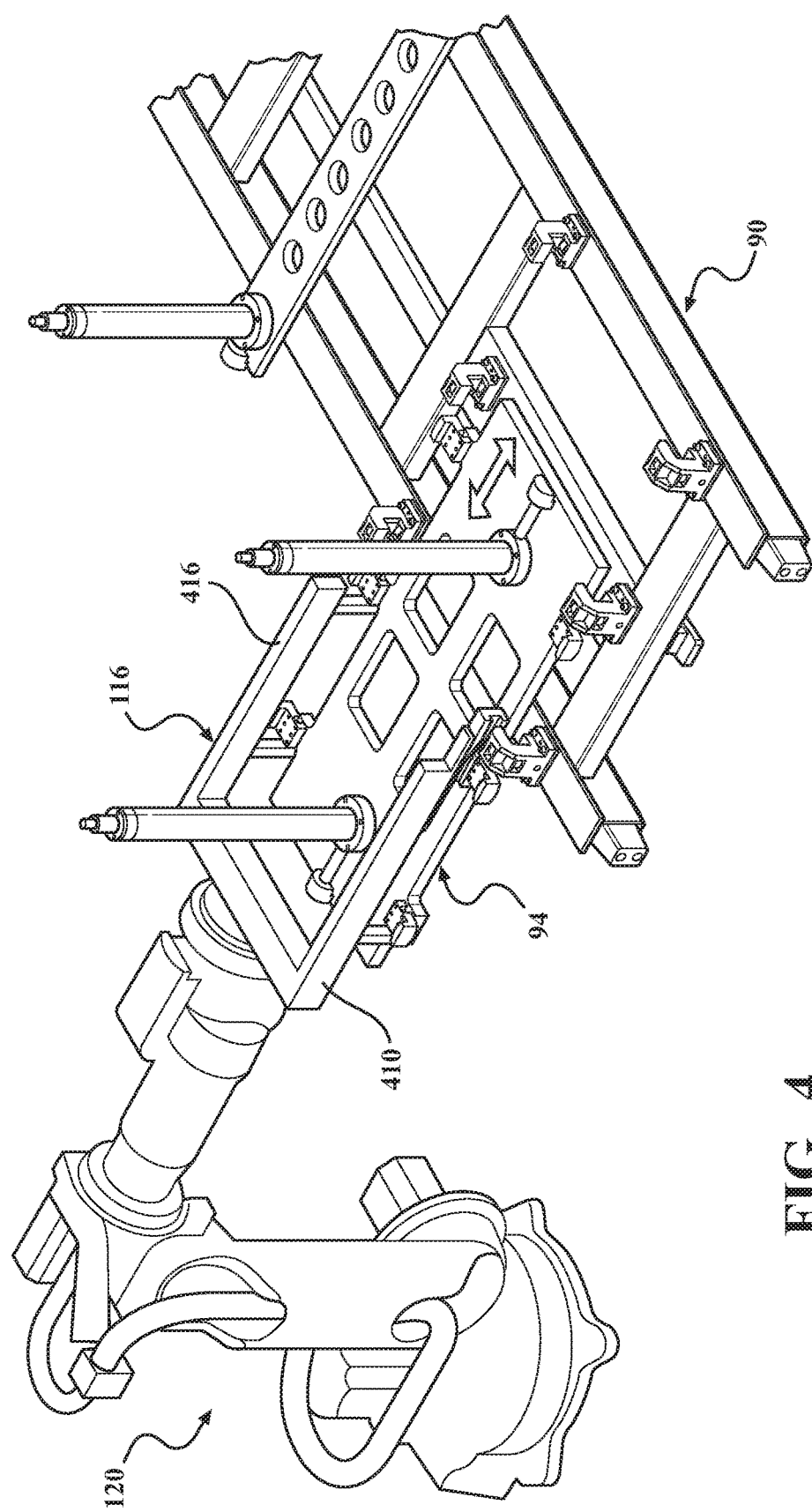
FIG. 4 is a perspective view of an example of installation of the modular plate in FIG. 2 to a pallet through use of an industrial robot and exemplary end effector frame.

Referring to FIG. 4 an example of installation and removal of modular plate 94 from pallet 12 through use of a programmable, multi-axis industrial robot 120 is shown. In the example, robot 120 includes an end effector in the form of a frame 116 which selectively engages the modular plate 94 and positions it on pallet 12 for use as further discussed below.

Referring to FIG. 5, the exemplary modular plate 94 is shown installed and secured to pallet 12 through use of six receivers 230, 290 and 380 as generally shown and further discussed below.

Referring to the FIG. 6 right side view (no risers 40 shown), the exemplary modular plate 94 is shown installed on the pallet 12 through engagement with a first receiver 230 (a portion of second receiver 290 positioned behind also in view) and a third receiver 380. Engagement of the modular plate 94 with the respective receivers is further discussed below.

FIG. 7 shows an end view of FIG. 5 with the modular plate 94 (with risers 40) installed and secured to pallet 12.

Figure 8:
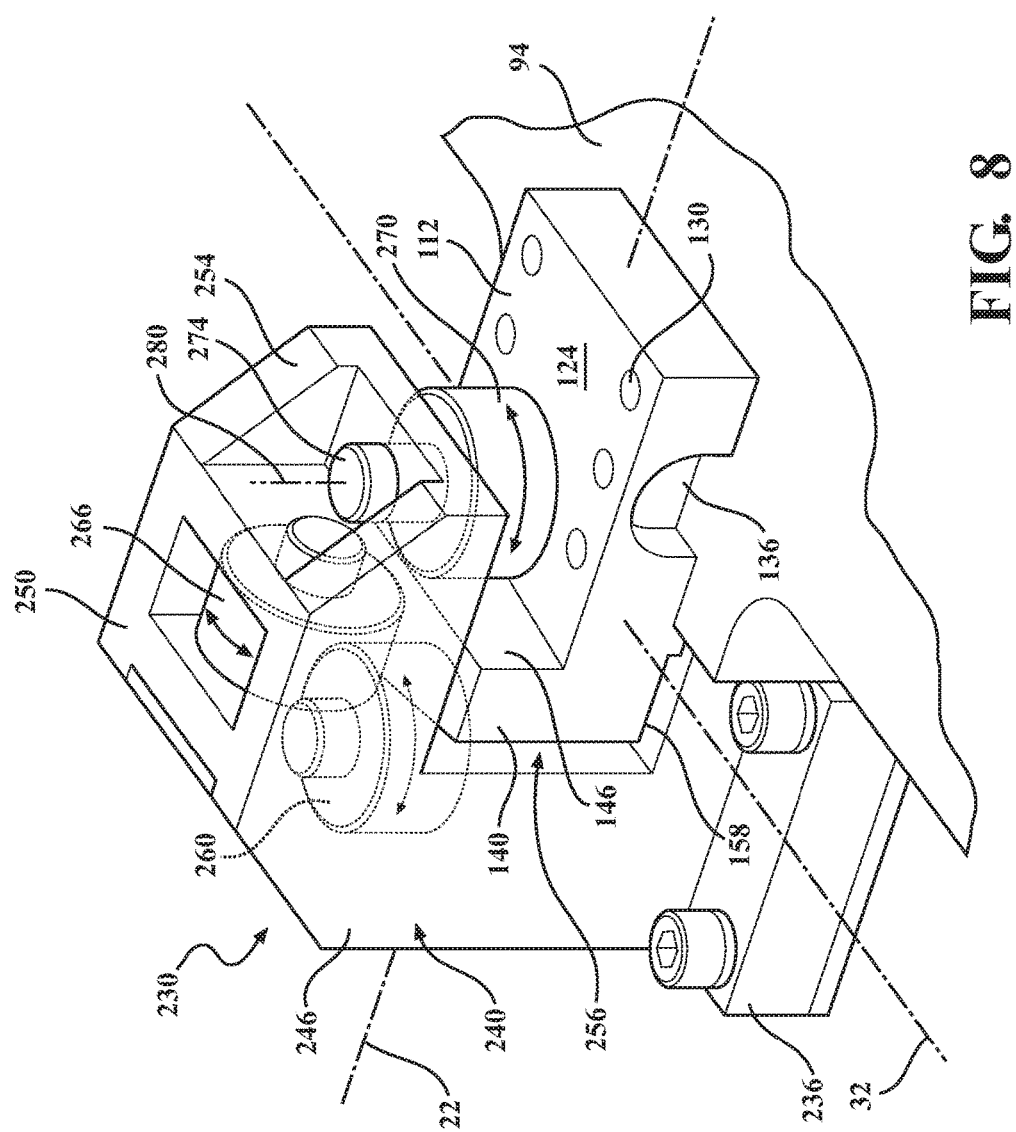
FIG. 8 is a perspective view of an example of a first plate locator positioned in an exemplary first receiver.
Figure 9:
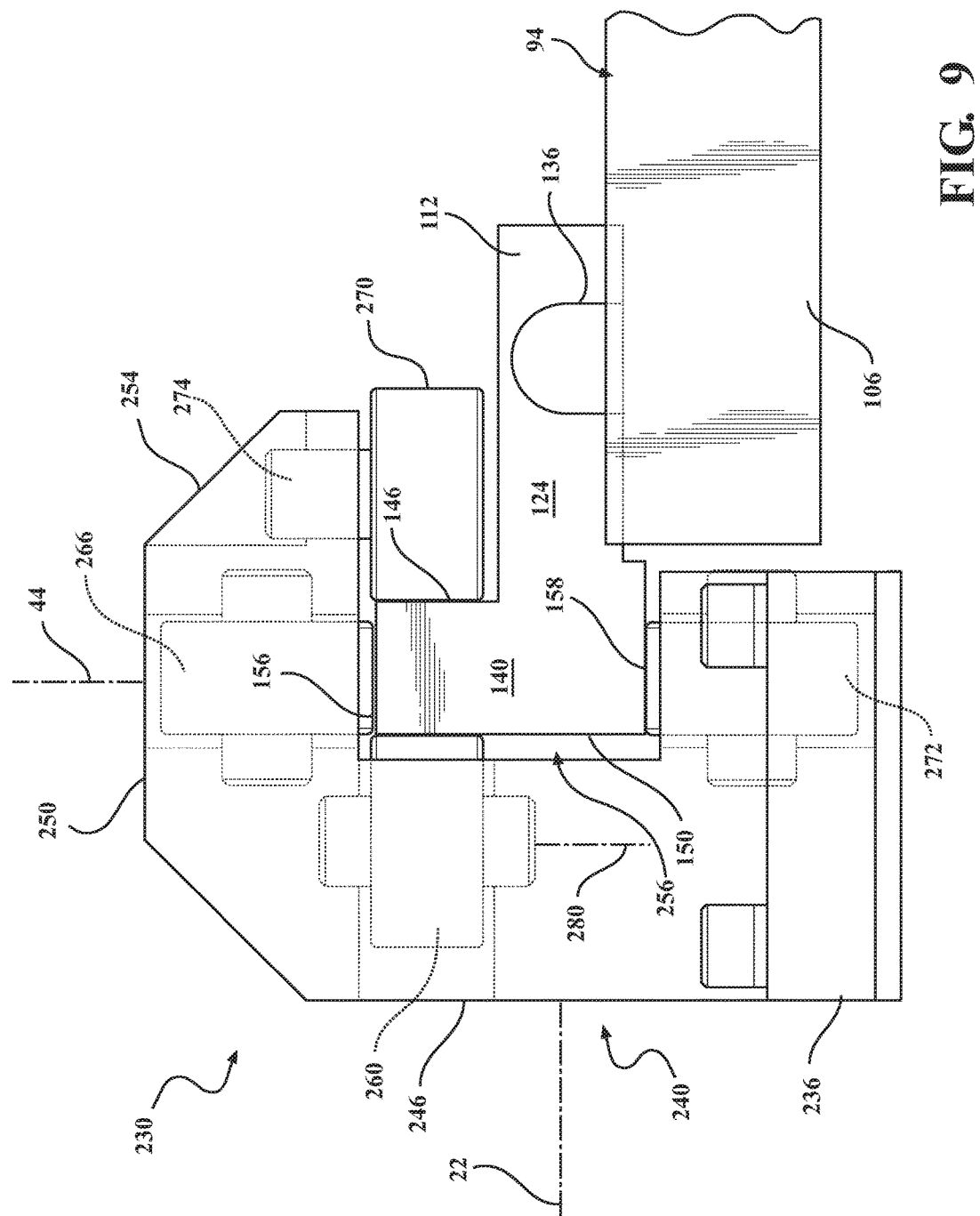
FIG. 9 is a side view of the first plate locator and first receiver in FIG. 8.

Referring to FIGS. 3, 8 and 9, an example of the first plate locator 112 for use in supporting modular plate 94 along the longitudinal axis 22 (X coordinate direction) and the vertical axis 44 (Z coordinate direction) is shown. In the example, first plate locators 112 are rigidly secured to support pads 106 of modular plate 94 preferably through bolts (not shown) so the locators 112 can be replaced if worn or damaged through use. Preferably, support pad 106 of modular plate 94 is precision machined to provide a clean, planar surface to accurately position first locator 112 relative to the plate 94 and risers 40.

In the example, first plate locator 112 includes base 124, mounting holes 130, a bore 136 extending laterally along lateral axis 32 (Y coordinate direction) into base 124 and an upright portion 140 having an inner surface 146, outer surface 150, upper surface 156 and a lower surface 158 as generally shown. Preferably, the inner 146, outer 150, upper 156 and lower 158 surfaces are machined surfaces to close dimensional tolerances or cast with high accuracy and precision. First locator 112 is shown used in two positions on plate 95 as best shown in FIG. 3 and selectively engage respective first receiver 230 as described further below.

Figure 10:
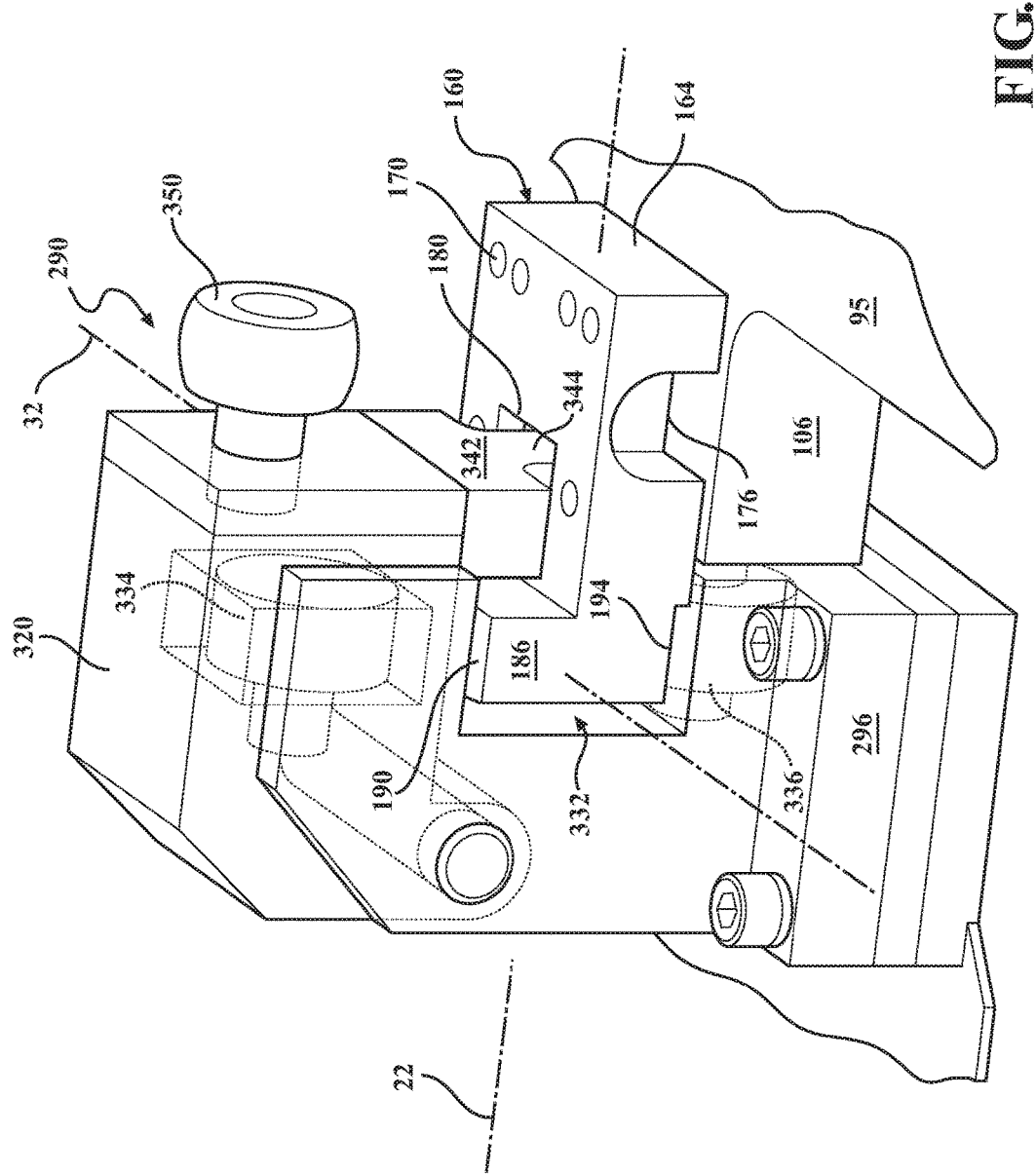
FIG. 10 is a perspective view of an example of a second plate locator positioned in a second receiver that is oriented in a second locked or engaged position.
Figure 11:
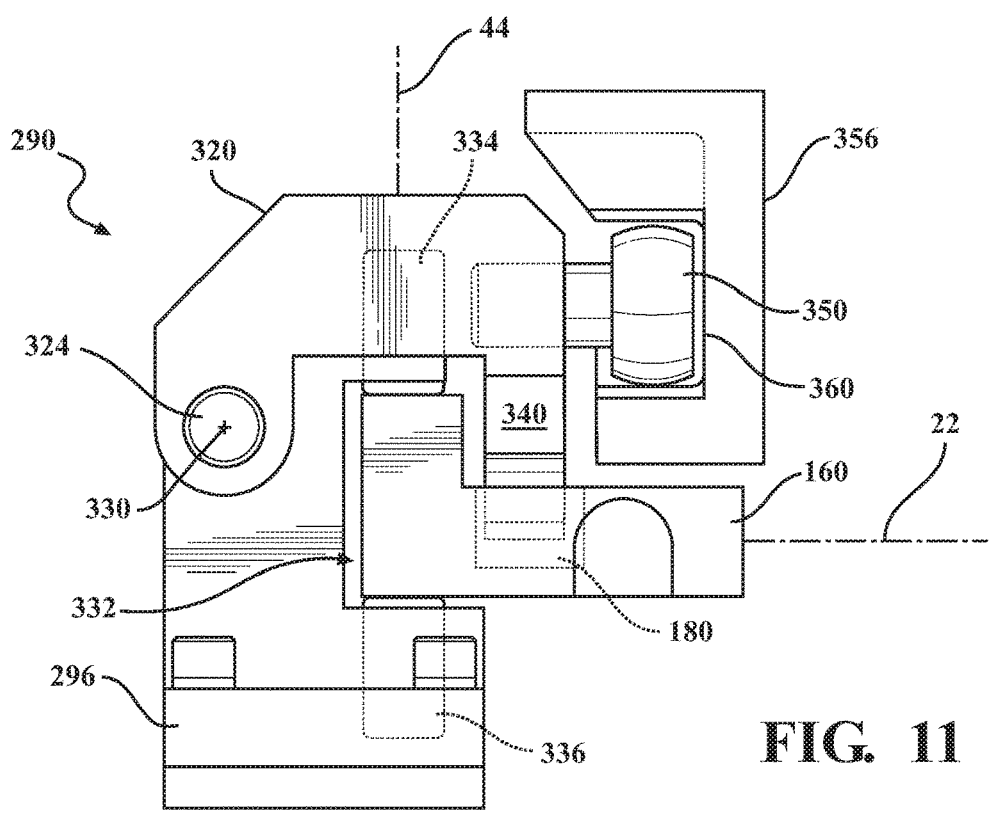
FIG. 11 is a side view of the second plate locator and second receiver in FIG. 10 in a second or locked position with a portion of the receiver positioned in an exemplary guide.
Figure 14:
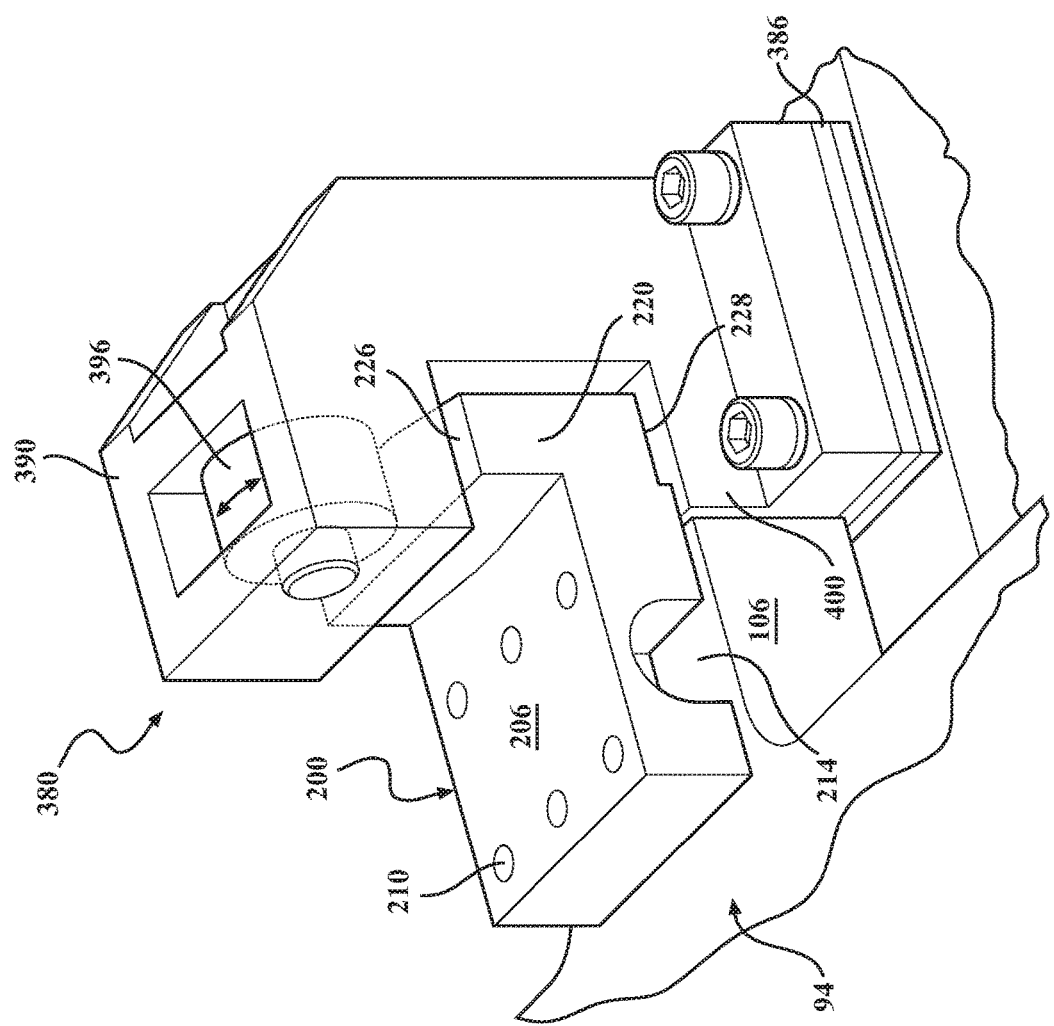
FIG. 14 is a perspective view of an example of a third plate locator positioned in a third receiver.

Referring to FIGS. 3, 10 and 11, an example of a second plate locator 160 for use in supporting the modular plate 94 along the lateral axis 32 (Y coordinate direction) and the vertical axis 44 (Z coordinate direction). In one example, a single second plate locator 160 is connected to plate 95 in coordination with a second receiver 290 as further discussed below. In the example, second locator 160 includes a base 164, mounting holes 170, a lateral bore 176 similar to bore 136 described above, a locking aperture 180 extending downward into base 164, an upright portion 186 having an upper surface 190 and a lower surface 194 as generally shown. Second locator 160 selectively and removably engages second receiver 290 as shown and described further below. Referring to FIG. 14 an example of a third plate locator 200 shown mounted to modular plate 94 support pad 106 for use in supporting modular plate 94 in the vertical axis (Z coordinate direction) is shown. In the example, third plate locator 200 includes a base 206, mounting holes 210, a bore 214 along the lateral axis 32, an upright portion 220 defining an upper surface 226 and a lower surface 228 as generally shown. Third plate locator 200 may further be of the same configuration and construction as first plate locator 112. In an alternate example (not shown), all of the locators 112, 160 and 200 may be of the same configuration, for example all including a locking aperture 180, or other features for commonality purposes.

In the example, first 112, second 160 and third 200 plate locators are secured to plate 94 and respective support pads 106 through bolts (not shown), other mechanical fasteners, or can be semi-permanently mounted through welding or other ways as understood by those skilled in the field. Plate locators 112, 160 and 200 are preferably made from hardened steel for abrasion resistance or other materials suitable for the particular application. It is also understood that plate locators 112, 160 and 200 may be an integral portion of modular plate 94. It is understood that first 112, second 160 and third 200 plate locators can have different sizes, shapes, dimensions, configurations as well as numbers and positional location on plate 95 other than those shown as known by those skilled in the field.

Referring to FIGS. 8 and 9, an example of first receiver 230 is illustrated. In the example, first receiver 230 includes a base 236 removably mounted to a pallet rail 20 (or crossmember 26 not shown) through bolts, other mechanical fasteners or semi-permanent methods such as welding. Exemplary first receiver 230 preferably includes a stationary arm 240 having an outer 246, upper 250 and inner 254 portions as generally shown. The arm 240 defines a first receiver cavity 256 for receipt of a plate locator discussed further below. In a preferred example, first receiver 230 includes a plurality of bearing surfaces to engage and position a plate locator in the first receiver cavity 256. In one example of the plurality of bearing surfaces, a first or outer roller 260, a second or upper roller 266, a third or inner roller 270 and a fourth or lower roller 272 is used. In the example, each roller 260, 266, 270 and 272 each including a respective axle 274 and an axis of rotation 280 relative to base 236 wherein a portion of each roller extends into the first receiver cavity (see FIG. 9). Base 236 and arm 240 are preferably made from hardened steel for strength, dimensional accuracy and abrasion resistance. Other sizes, shapes, configurations, numbers, orientations and materials may be used as known by those skilled in the field.

In a preferred example, outer 260, upper 266, inner 270 and lower 272 rollers are rigidly and rotatably secured to respective base 236 or arm 240 and are made from hardened steel for dimensional accuracy, abrasion and wear resistance. In a preferred example, outer 260, upper 266, inner 270 and lower 272 rollers are permanently mounted to the respective base 236 and arm 240 so as to maintain accurate and precise positioning with respect to the pallet 12, first locator 112 and modular plate 94. It is understood that different sizes, shapes, configurations, numbers, orientations and materials for rollers 260, 266, 270 and 272 may be used as understood by those skilled in the field. It is further understood that one or more of exemplary bearing surfaces in the form of rollers 260, 266, 270 and 272 may be replaced with non-roller devices, for example stationary bearing surfaces, for example wear resistant plates and other devices known by those skilled in the art.

In a preferred example as best seen in FIG. 9, on installation of modular plate 94 onto pallet 12 and the first 230, second 290 and third 320 receivers, first plate locator 112 is positioned in the first receiver cavity 256 relative to the first receiver 230 as shown. In the example, first plate locator 112 inner surface 146 is in direct contact and rolling engagement with inner roller 270, outer surface 150 is in direct contact and rolling engagement with first receiver 230 outer roller 260, upper surface 156 is in direct contact and rolling engagement with upper roller 266 and lower surface 158 is in direct contact and rolling engagement with lower roller 272. These structures operate to position modular plate 94 in a predetermined X (22) and Z (44) coordinate directions relative to the pallet 12. The predetermined X (22) and Z (44) position of the modular plate 94 relative to the pallet 12 effectively positions the riser 40 locating pin 54 in an accurate and precise predetermined X (22) and Z (44) coordinate position that is specific to a predetermined product or vehicle model, for example a first vehicle model. This effectively configures or customizes assembly pallet 12 to coordinate and engage the specific product or vehicle model being assembled. On the described engagement between the exemplary receiver rollers and the plate locators, the engagement prevents, or substantially prevents, relative movement of modular plate 94 along the longitudinal axis 22 (X coordinate direction) and along the vertical axis 44 (Z coordinate direction) relative to the pallet 12 while allowing first locator 112 and modular plate 94 to move along the lateral axis 32 (Y coordinate direction) during installation and removal of modular plate 94 from pallet 12 as further described below.

Referring to FIGS. 10-13, an example of a second receiver 290 for selectively receiving and securing second locator 160 and modular plate 94 to pallet 12 is shown and described below. In the example best seen in FIG. 13, second receiver 290 includes a base 296 having a fork 300 defining a slot 306. An arm 320 is positioned in the slot 306 and rotatably secured by a pivot pin 324 allowing arm 320 to rotate about an axis of rotation 330 from a first disengaged position (FIG. 12) to a second engaged position (shown in FIGS. 10 and 11) relative to base 296. The arm 320 and/or the base 296 define a second receiver cavity 332 for receipt of a plate locator as further described below.

As best seen in FIG. 10, second receiver 290 preferably includes at least one (two shown) bearing surfaces for engagement with a plate locator. In the example, the at least one bearing surface includes an upper or first roller 334 and a lower or second roller 336 rotatably secured to the respective base 296 or arm 320 through a respective axle about an axis of rotation. As with first receiver 230, each roller 334 and 336 includes a portion extending into the second receiver cavity 332. Upper 334 and lower 336 rollers are preferably secured and made from the same materials as the rollers described for first receiver 230 above. Second receiver 290 may be made from the same materials as the first receiver 230 described above. It is understood that different sizes, shapes configurations, orientations, numbers and materials for the receiver 290 and bearing surfaces may be used as known by those skilled in the art. For example, one or more of the rollers 334 and 336 may be replaced by stationary wear resistant plates as described for first receiver 230.

In a preferred example, second receiver 290 includes a locking pin 340 connected to rotatable arm 320. Locking pin 340 preferably has an upper portion 342 connected to arm 320 and a downwardly extending lower portion 344 which is selectively positioned down into the locking aperture 180 of the second locator 160 when arm 320 is in a second position as shown in FIGS. 10 and 11. In this second position with locking pin 340 positioned down into locking aperture 180, upper roller 334 is in direct contact and in rolling engagement with the second plate locator 160 upper surface 190 and lower roller 336 is in direct contact and rolling engagement with lower surface 194 as generally shown. In this arm 320 second position, the second locator 160 and modular plate 94 are positioned in a predetermined a predetermined Y (32) and Z (44) coordinate directions relative to the pallet 12. The predetermined Y (32) and Z (44) position of the modular plate 94 relative to the pallet 12 effectively positions the risers 40 locating pins 54 in an accurate and precise predetermined Y (22) and Z (44) coordinate position that is specific to a predetermined product or vehicle model, for example a first vehicle model. This effectively configures or customizes assembly pallet 12 to coordinate and engage the specific product or vehicle model being assembled. In one example not shown, second receiver 290 may eliminate the rollers 336 and 344 and rely only on positioning and securing modular plate 94 in the Y coordinate direction 32 through locking pin 344 as described.

Figure 12:
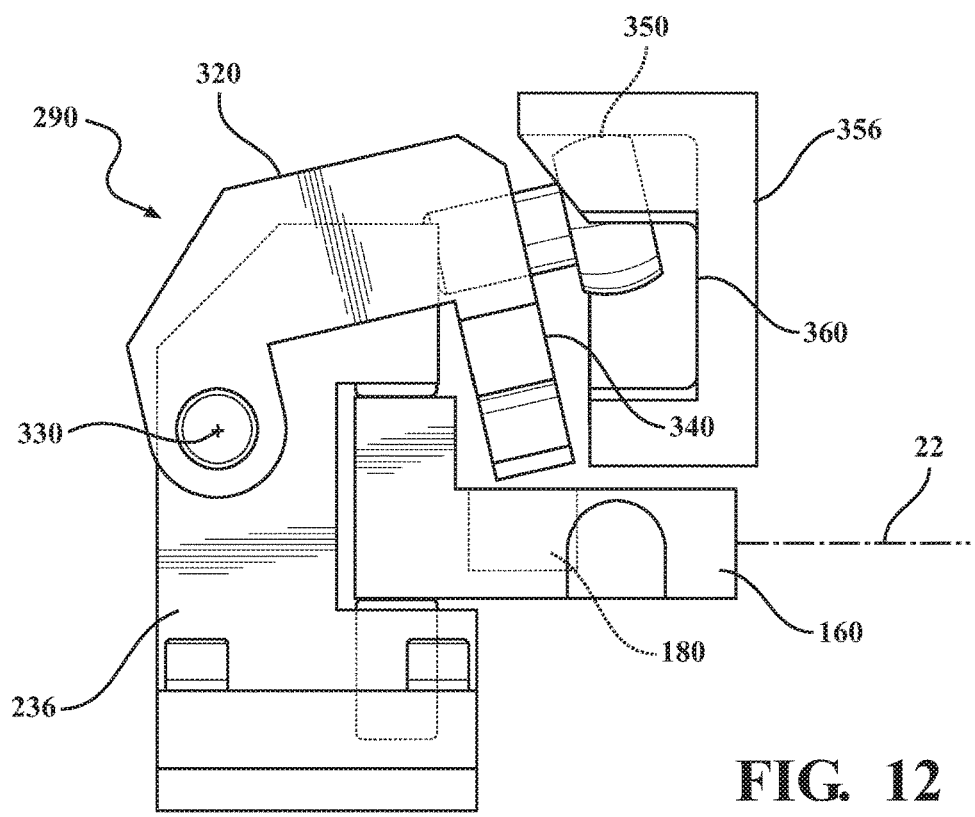
FIG. 12 is an alternate side view of FIG. 11 showing the second receiver in a first, disengaged or open orientation with respect to the second plate locator.

Referring to FIG. 12, the first or disengaged position of second receiver 290 arm 320 is shown. In the example in the second position, arm 320 is rotated about axis of rotation 330 such that locking pin 340 is removed from locking aperture 180 in the second plate locator 160 as generally shown. In this first disengaged position, second locator 160 and modular plate 94 may move relative to second receiver 290 and pallet 12 along the lateral axis 32 (Y coordinate direction), for example when the modular plate 94 is being installed or removed from pallet 12. In a preferred example, second receiver 290 is normally positioned or biased to be in the second or engaged/locked position to orient locking pin 340 into locking aperture 180. This example ensures that if a modular plate 94 is installed on pallet 12, the modular plate 94 is prevented from movement along the lateral axis 32. A biasing device, for example a spring or detent (not shown) may be used to bias or force arm 320 toward the second engaged position as described. Other biasing or detent devices or features, for example pneumatic, magnetic, or other devices known by those skilled in the art may be used. It is also understood that arm 320 may be normally biased toward the first disengaged position and moved toward the second position or simply oriented to the second position under the force of gravity or other biasing device as described and as otherwise known by those skilled in the art.

Figure 13:
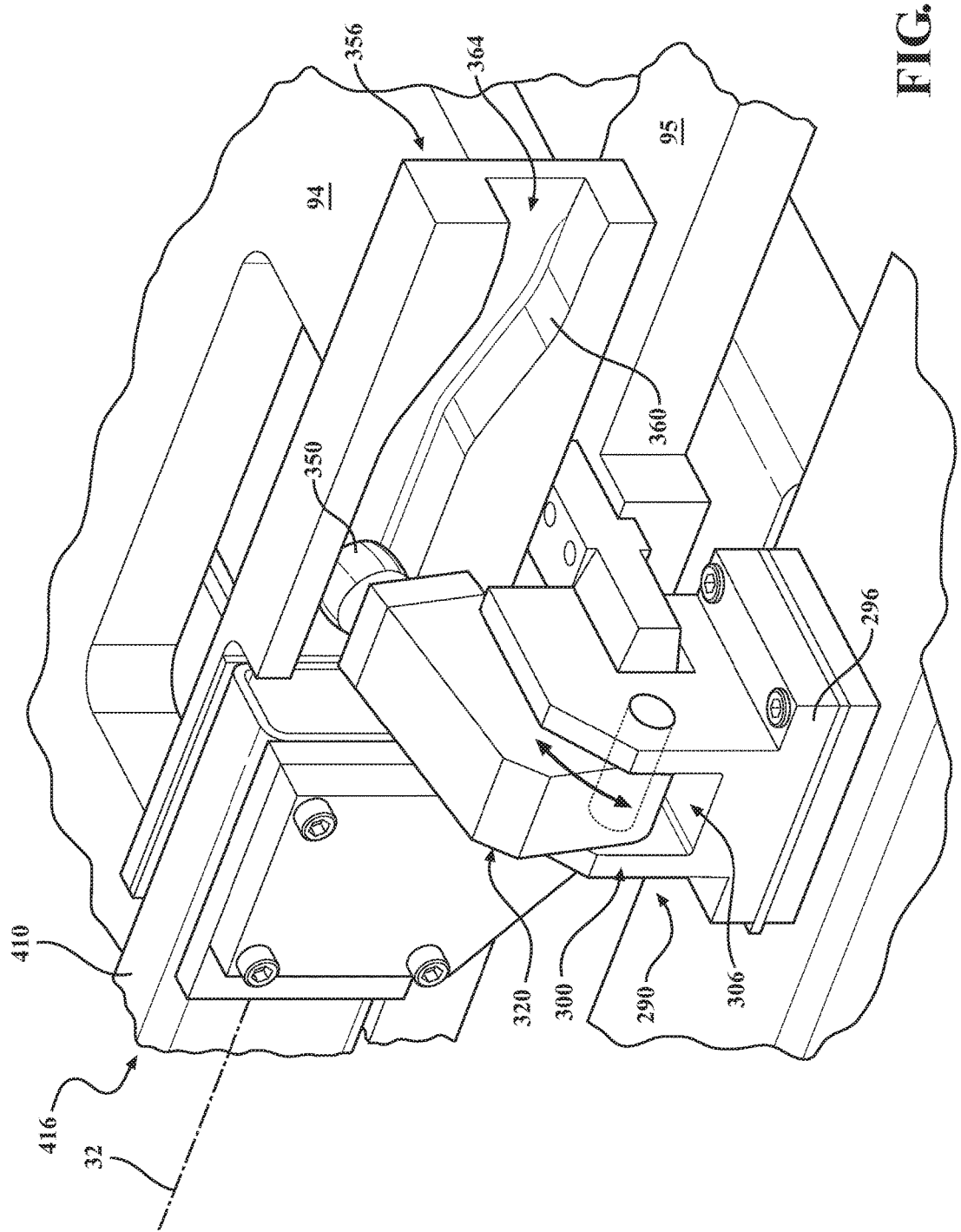
FIG. 13 is a perspective view of the second receiver oriented in a first disengaged position in an exemplary guide.

In a preferred example best seen in FIGS. 10, 11 and 13, second receiver 290 arm 320 includes a cam roller 350 extending inward toward plate 94 as generally shown. In a preferred example, modular pallet system 90 end effector 116 includes a guide 356 connected to the end effector 116 as further described below. Exemplary guide 356 includes a longitudinal, contoured track or slot 360 extending along the lateral axis 32 as best seen in FIG. 13. Track 360 includes an open end 364 whereby cam roller 350 can enter and exit the track 360 when the end effector 116 and guide 356 are positioned adjacent one another and end effector 116 is moved along the lateral axis 32 (Y coordinate direction).

Referring to FIGS. 4 and 13, in a preferred example, on installation of a modular plate 94 to pallet 12, end effector 116 and guide 356 are positioned along the longitudinal 22 (X), lateral 32 (Y) and vertical 44 (Z) positions such that the first 112, second 160 and third 200 plate locators are aligned or in proximity to respective first 230, second 290 and third 380 receivers. In this position, guide 356 slot opening 364 is aligned with cam roller 350 in arm 320 first position as generally shown in FIG. 11. As robot 120, end effector 116 and modular plate 94 continue movement along the lateral axis 32 toward a full or secured installation position, contoured track 360 angles upward as shown in FIG. 13 thereby forcibly raising cam roller 350 and arm 320 upward toward the arm first disengaged position as described above and shown in FIG. 12 prior to second locator 160 reaching the second receiver 320 so as to clear locking pin 340 from contacting second plate locator 160. On reversal of movement of robot 120, end effector 116 and guide 356 along the lateral axis 32, cam roller 350, arm 320 and locking pin 340 are returned to their second engaged position wherein the locking pin 340 is re-positioned in locking aperture 180 thereby locking the modular plate 94 from movement along the lateral axis 32 (Y coordinate direction) relative to second receiver 290 and pallet 12.

It is understood that guide 356 and track 360 may take other forms, configurations, numbers and orientations as known by those skilled in the art. It is also within the present invention that a secondary locking device (not shown) may be used to further lockingly secure modular plate 94 to pallet 12 preventing movement along the lateral axis 32 or other axes 22 and 44.

Although second receiver 290 arm 320 is described as being rotatable from a first disengaged position to a second engaged position in order to engage or disengage locking pin 340 from locking aperture 180, it is understood that other devices and methods can be used in order to insert locking pin 340 into locking aperture 180. For example, a linear slide device or arm may be used instead of the rotating arm 320 as described. Other devices and methods for preventing modular plate 94 from moving in the lateral axis direction (Y coordinate direction) relative to pallet 12 known by those skilled in the art may be used.

Figure 15B:
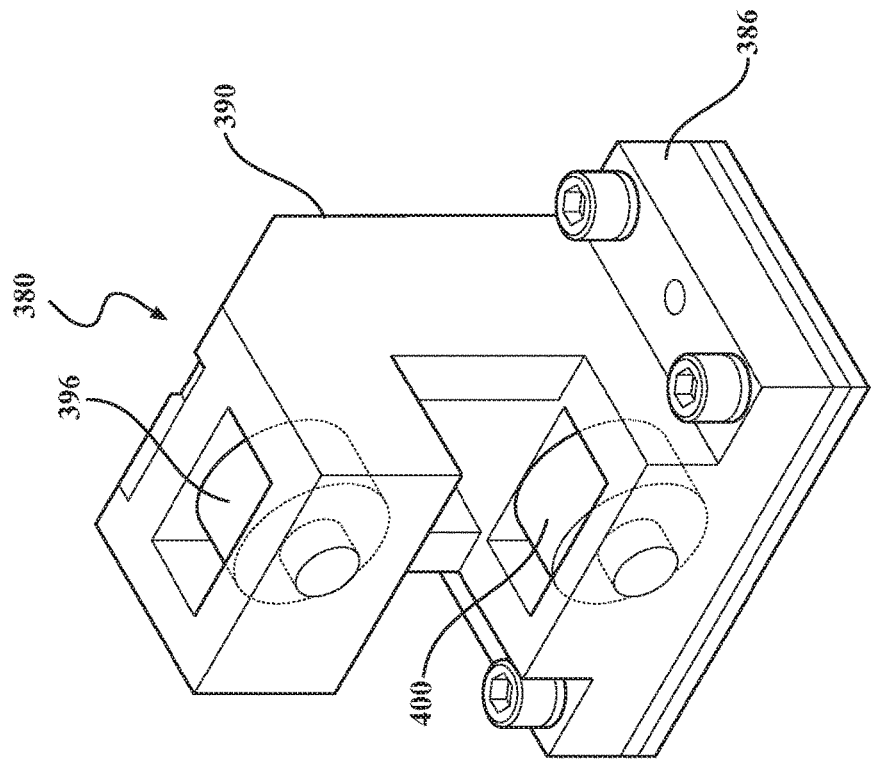
FIG. 15B is an alternate perspective view of FIG. 14 showing the third receiver without the third plate locator.
Figure 15A:
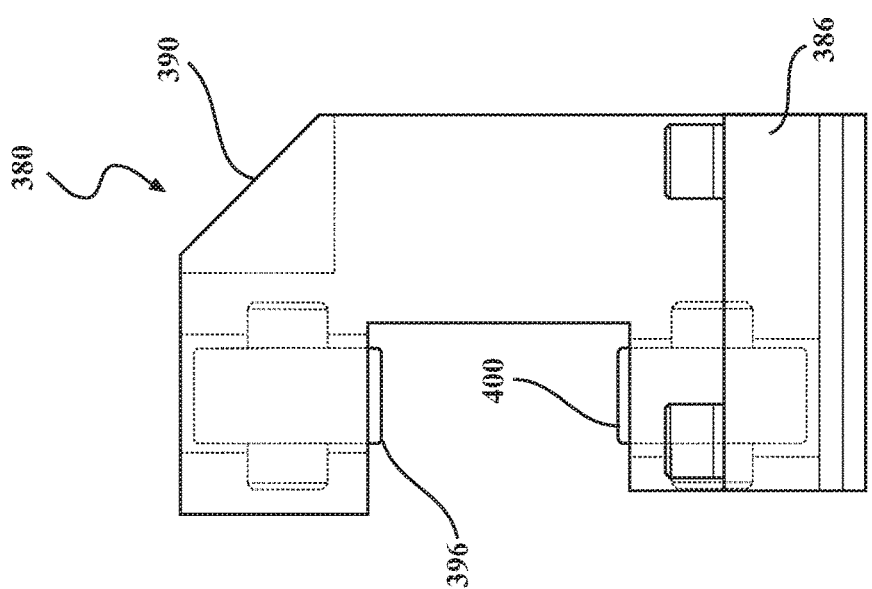
FIG. 15A is a right-side view of the third receiver shown in FIG. 14 without the third plate locator.

Referring to FIGS. 14, 15A and 15B, an example of a third receiver 380 for use in modular reconfigurable pallet system 90 is illustrated. In one example as best seen in FIGS. 4 and 5, three third receivers 380 are positioned on respective rails 20 or a pallet center support to receive and secure third plate locator 200 and modular plate 94 to pallet 12. As shown in FIG. 5, the third receivers 380 are all positioned on one side opposite the first 290 and second 320 receivers. It is understood that different locations for the third receivers 380 may be used.

As best seen in FIGS. 14A, 15A and 15B, exemplary third receiver 380 includes a base 386 and an arm 390. In the example, arm 390 defines a third receiver cavity 402 for receipt of a plate locator described below. Exemplary third receiver 380 includes at least one bearing surface for engagement with a locator positioned in the third receiver cavity 402. In the example, the at least one bearing surface includes an upper or first roller 396 and a lower or second roller 400 as generally shown. In the example, base 386 is mounted to a rail 20 or pallet center structure through bolts, other mechanical fasteners or semi-permanent attachment methods such as welding.

As best seen in FIG. 14, on installation of modular plate 94 and third plate locator 200, upper roller 396 is in direct contact and rolling engagement with third locator upper surface 226 and lower roller 400 is in direct contact and rolling engagement with lower surface 228 as generally shown. In this position, the modular plate 94 is positioned in a predetermined a predetermined Z (44) coordinate direction relative to the pallet 12. The predetermined Z coordinate (44) position of the modular plate 94 relative to the pallet 12 effectively further positions the risers 40 locating pins 54 in an accurate and precise predetermined Z coordinate (44) position that is specific to a predetermined product or vehicle model, for example a first vehicle model. This effectively configures or customizes assembly pallet 12 to coordinate and engage the specific product or vehicle model being assembled. In this position, the third plate locator 200 and modular plate 94 are prevented, or substantially prevented, from movement along the vertical axis 44 (Z coordinate direction) relative to third receiver 380 and pallet 12. Rollers 396 and 400 may be made from the same materials and secured to the respective base 386 an arm 390 as the rollers for the first 230 and second 290 receivers as described above. As noted above, the at least one bearing surface may take forms other than the described two rollers, for example wear-resistant skid plates, which abut the third locator 200. The third receiver may be made from the same materials and include variations described above for the first receiver 290. As described, the third receivers 380 can take the form as described for the first receiver 290.

In one example of modular pallet system 90, a plurality of electronic sensors (not shown) may be employed to monitor the state or position of an individual component or position of engagement between two components. For example, one or more sensors may be used between the plurality of plate locators 112, 160 and 200 and the respective plurality of receivers 230, 290 and 380 to determine or monitor whether the locators are properly positioned in the respective receiver. In another example, a sensor may be used to determine whether second receiver 290 arm 320 is in the first disengaged or second engaged position. Alternately, or in addition to, a sensor may be used to determine or monitor whether locking pin 340 is positioned in locking aperture 180. The exemplary sensors may be electronic through wires or wireless protocols to send signals to computers, processors and/or servers in local, central or remote monitoring stations for monitoring by human operators. The electronic sensors may be of other forms, for example optical or vision sensors. Other sensors and monitoring devices and/or systems may be used as known by those skilled in the art.

Figure 16:
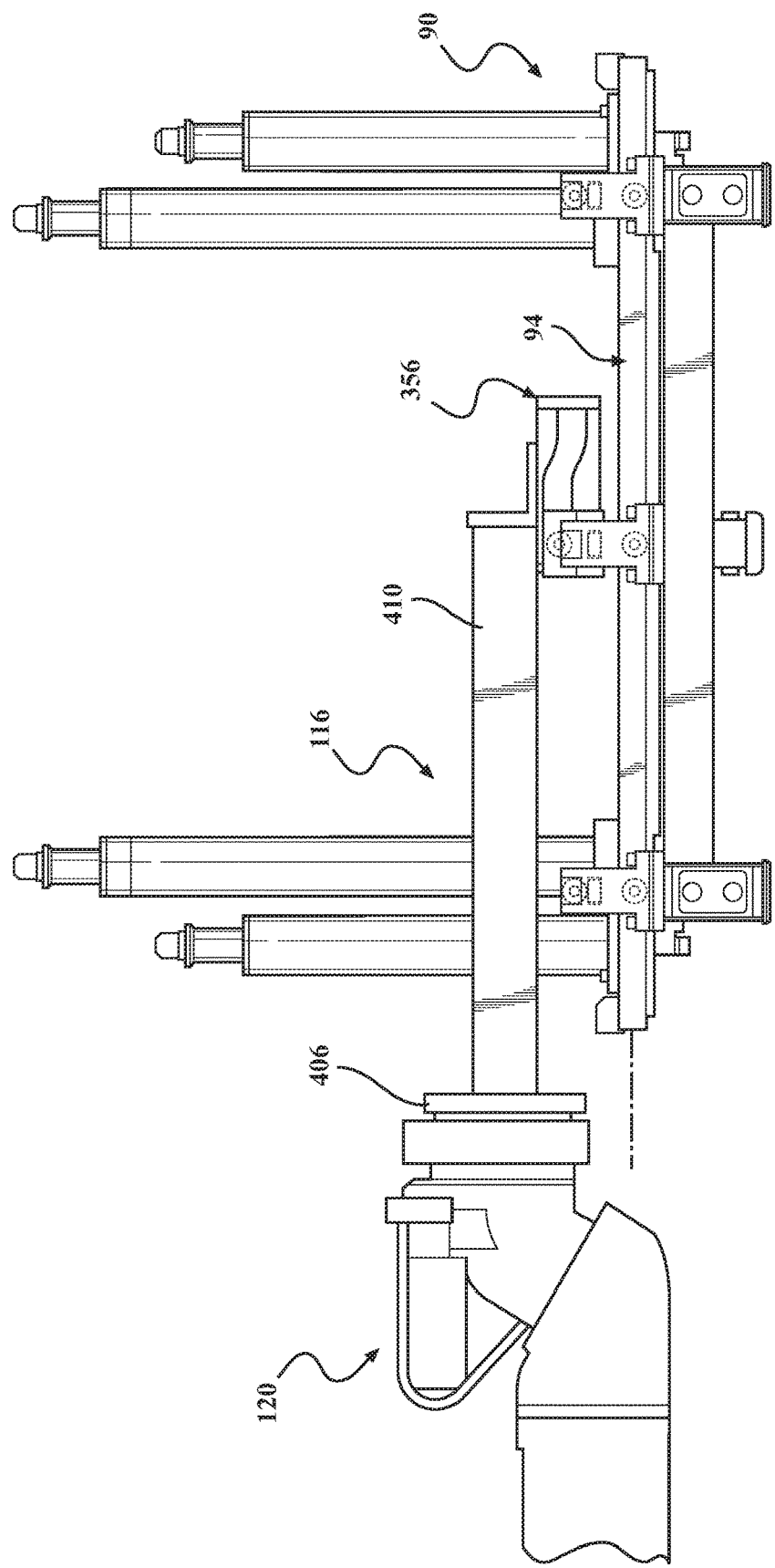
FIG. 16 is an end elevational view of an example of an end effector frame connected to an industrial robot for installing and removing modular plates from the pallet.
Figure 17:
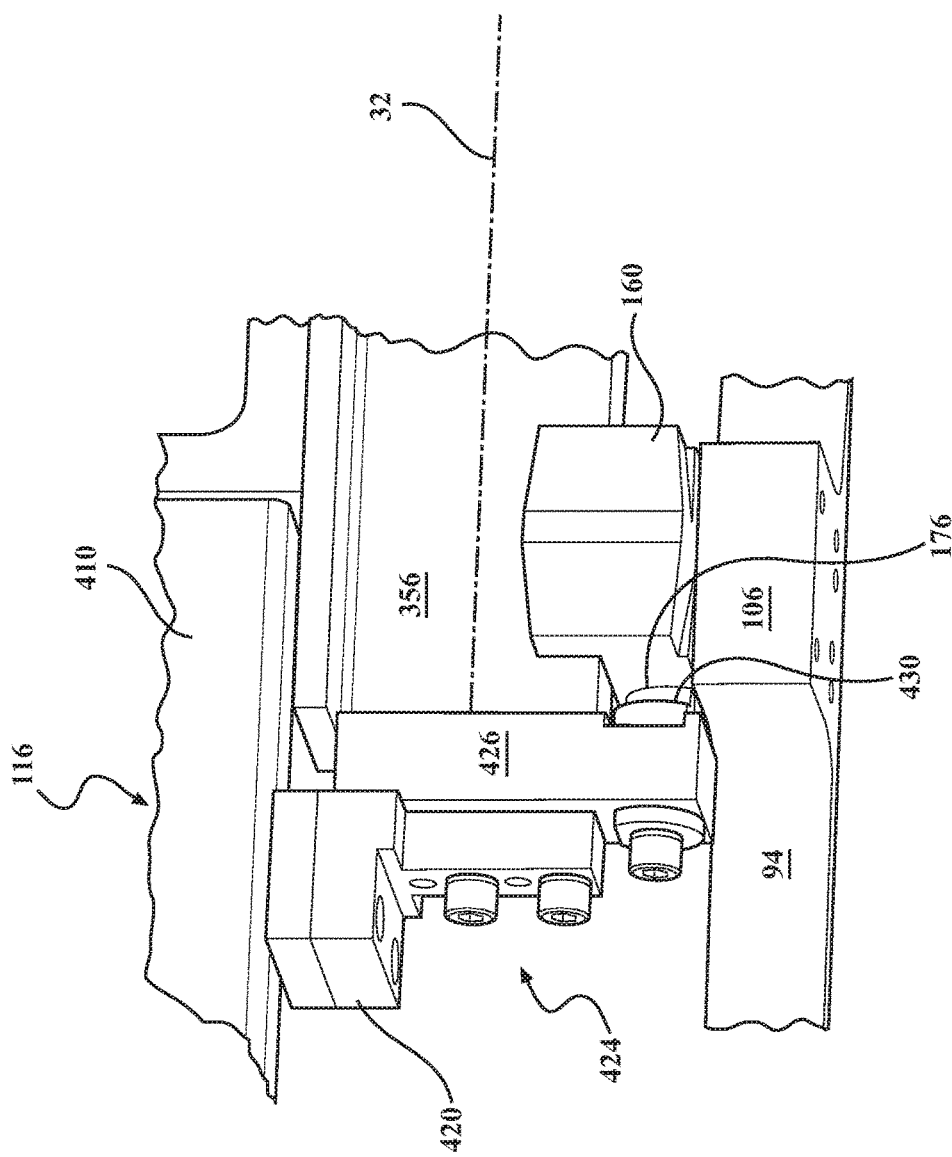
FIG. 17 is an enlarged partial perspective view of FIG. 16 showing an example of a transfer pin on the end effector frame used to engage the modular plates.

Referring to FIGS. 4, 16 and 17, an example of end effector 116 for engaging and transferring modular plate 94, and a plurality of different modular plates 94, for example a first and a second modular plate configured for different products or vehicle bodies, is shown. In the example, end effector 116 includes a connector 406 engageable with a wrist or mounting plate of robot 120. Exemplary end effector 116 includes a first arm 410 and an opposing second arm 416 as generally shown. As best seen in FIGS. 4, 16 and 17, in one example, guide 356 is connected to the end of first arm 410 opposite connector 406.

In the example as best seen in FIGS. 4, 16 and 17, each of the end effector 116 first 410 and second 416 arms have two modular plate connectors 424. Each exemplary plate connector 424 includes a mounting block 420 connected to the respective arm 410, 416, a pin block 426 connected to the mounting block, and a transfer pin 430 extending outwardly from the pin block along the lateral axis 32 (as illustrated). The transfer pins 430 are sized and oriented to selectively enter four of the respective first 112, second 160, and third 200 plate locator bores 136, 176 and 214 to engage modular plate 94 to end effector 116 and robot 120.

In the example shown, arms 410 and 416 only engage the first two pairs of locators (shown to the left in FIG. 4) located closest to the robot 120. On engagement of the modular plate to the end effector 116 and robot 120, modular plate 94 may be oriented and positioned so as to align and engage the first 120, second 160 and third 200 plate locators with the respective first 230, second 320 and third 380 receivers through further movement of the modular plate 94 along the lateral axis 32 to engage the receivers as described above. It is understood that other devices and methods for engaging end effector 116 with modular plate 94, or engaging robot 120 to modular plate 94, may be used by those skilled in the art. For example, end effector 116 can engage fewer or more of the first 112, second 160 and third 200 locators and through different structures or methods than the plate connectors 424. Although robots 120 are shown to engage and manipulate modular plates 94, other devices, for example forklifts, or other equipment may be used to engage, move and position plate 94 relative to pallet 12, as known by those skilled in the art.

Through engagement of the first 112, second 160, third 200 plate locators with the respective first 230, second 290 and third 380 receivers, the modular plate 94, and risers 40 positioned thereon, are positioned in predetermined positions specific to a product or vehicle model as described above and secured from movement in all three axes 22, 32 and 44 (all X, Y and Z coordinate directions) from movement relative to pallet 12. Through the process of prefabricating plate 95 and mounting of risers 40 thereon as described above, in a preferred example, this secured or locked position of vehicle model specific modular plate 94 to pallet 12 is capable of positioning the locating pins 54 within +/−0.1-0.13 millimeters (mm) from a design or predetermined 3-dimensional X (22), Y (32) and Z (44) coordinate position for specific products or vehicle models. Levels of dimensional accuracy and precision above and below this range may be achieved as known by those skilled in the art.

To remove the engaged modular plate 94 from pallet 12, end effector 116 is positioned so that transfer pins 430 are engaged with the respective locators, and guide 356 has engaged cam roller 150 thereby raising arm 320 to its first disengaged position thereby removing locking pin 340 from locking aperture 180. Slight upward movement or force by the robot 120 in the Z axis or direction 44 frictionally engages the end effector 116 to the plate 94 through the transfer pins 430. In the preferred example, this position permits movement of the modular plate 94 along the lateral axis 32 (Y coordinate direction). Once arm 320 is in a first or disengaged position from second locator 160, robot 120 and end effector 116 may be moved along the lateral axis 32 until the locators are disengaged from the respective receivers and the modular plate 94 can be vertically raised, removed from pallet 12 and relocated to an adjacent modular plate 94 storage rack, or moved to a different location, for example by placement of the modular plate 94 on an automated guided vehicle (AGV) or automated guided cart (AGC) for transport to a remote or centralized storage area in the assembly facility.

Figure 18:
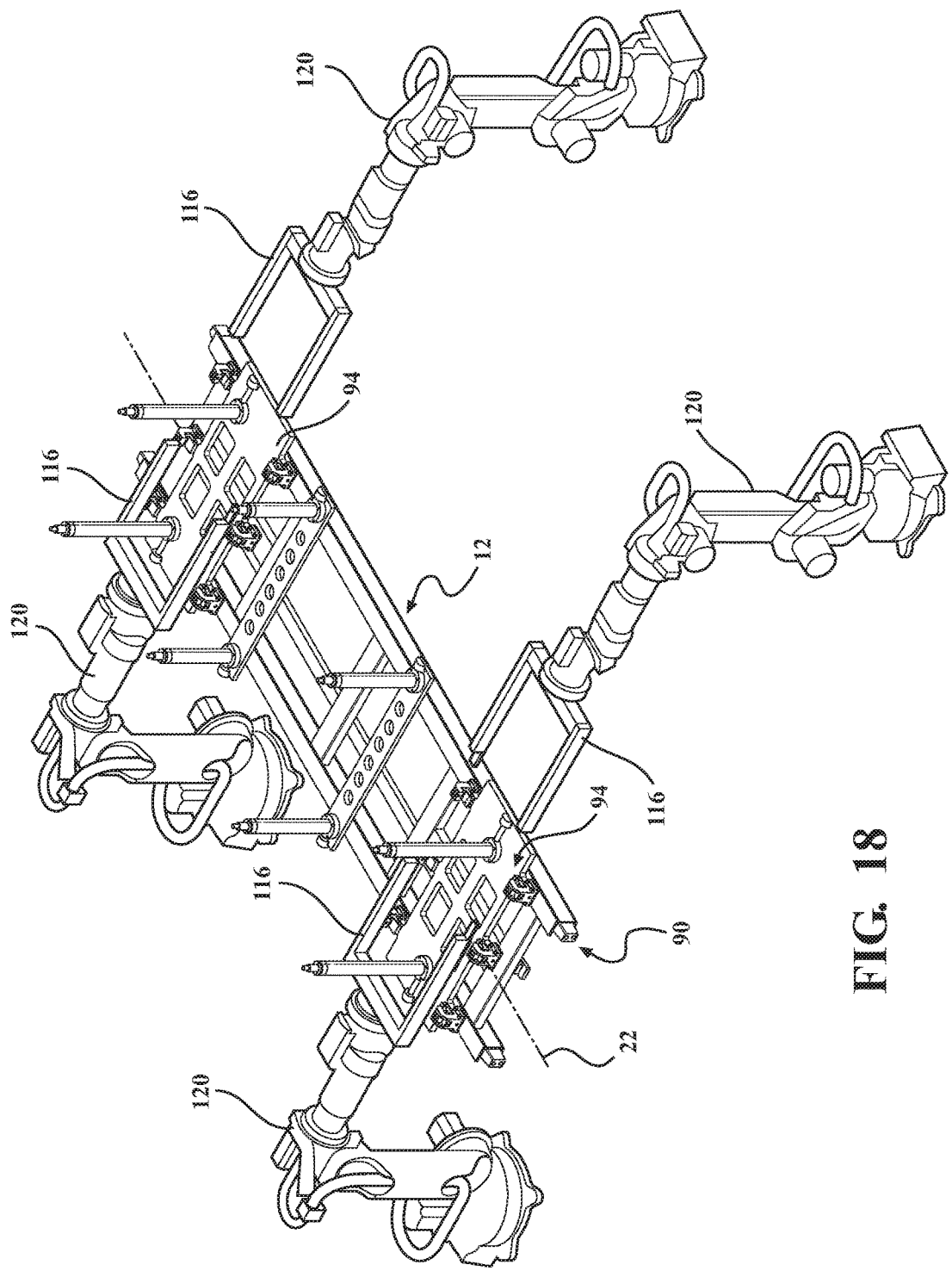
FIG. 18 is an example of an application of the modular reconfigurable vehicle assembly pallet shown in FIG. 2.
Figure 19:
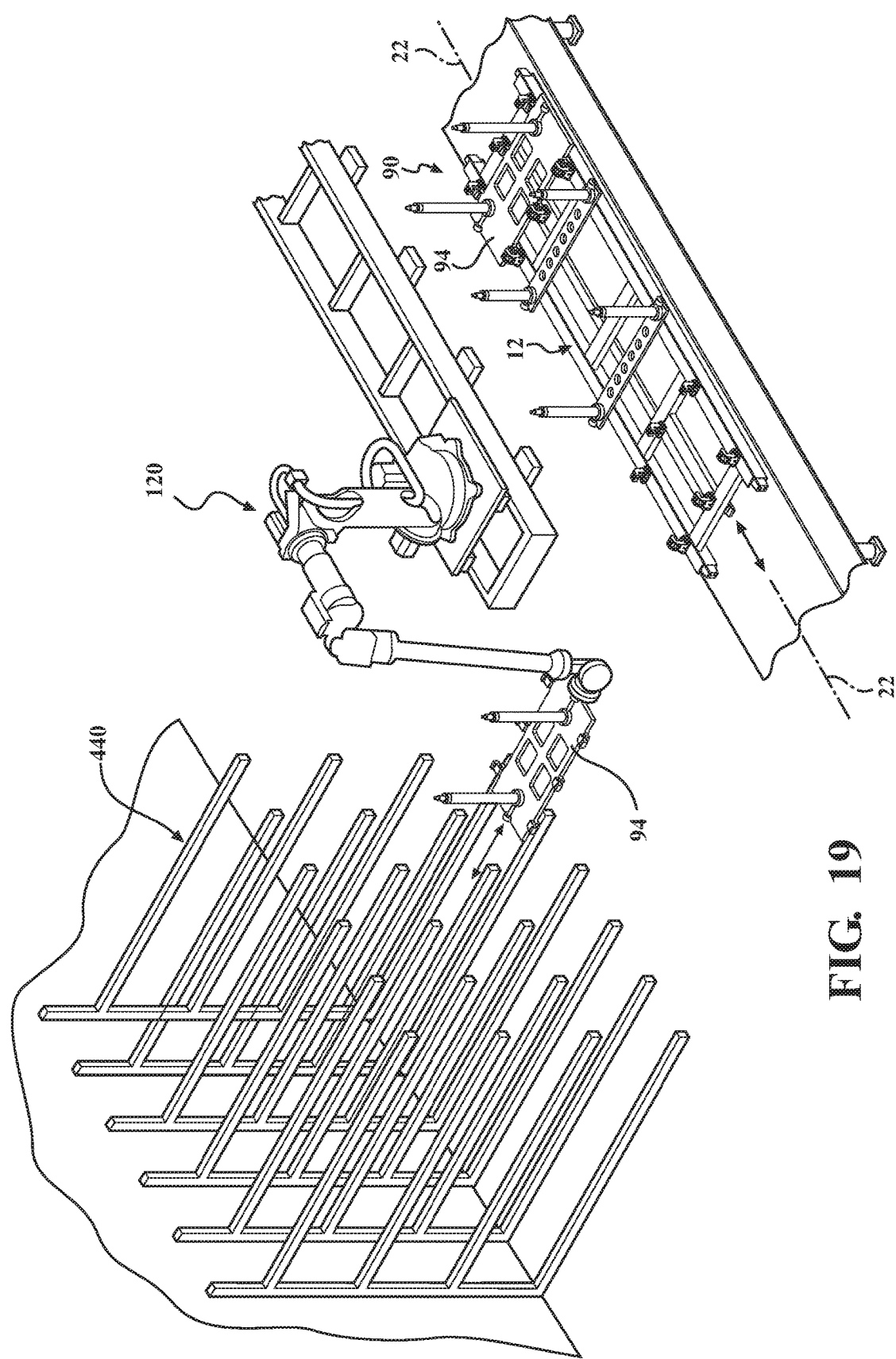
FIG. 19 is an example of a modular vehicle assembly pallet in use with a robot for installing and storing vehicle specific modular plates in a storage rack.

Referring to FIGS. 18 and 19, one example application of modular reconfigurable assembly pallet system 90 is shown. In the example, four robots 120 are used, two robots 120 positioned on either side of an assembly or pallet transfer line. As best seen in the example shown in FIG. 19, one or both sides of the transfer line includes a storage device or rack 440 (shown on one side only) including multiple shelves for supporting and storing a plurality of modular plates 94 for at least a first vehicle model and preferably at least a second product or vehicle model. In one example, a plurality of first modular plates 94 including risers 40 and locating pins 54 having a position and geometry specific to a first vehicle model A are stored or racked on one side of the transfer line in storage rack 440 and a plurality of second modular plates 94A specific to a second vehicle model B are positioned on the other side of the transfer line. In one example, pallets 12 moving down the transfer line can be selectively equipped with the appropriate modular plate(s) 94 or 94A to coordinate with the predetermined assembly line product or vehicle body assembly sequence in real time. In an alternate example, each storage rack 440 may store a plurality of different modular plates 94 for a plurality of different vehicle models or products to be assembled. As the type of vehicle models in the assembly sequence changes, the robots 120 can remove the installed modular plate, for example a first modular plate 94, with a second modular plate 94A to accommodate the change in the type or model of vehicle to be assembled.

Alternately, a predetermined number of pallets 12 with first modular plates 94 and/or second modular plates 94A can be configured in a separate pallet configuration line or area and transitioned into an assembly sequence. This provides a substantial improvement and flexibility over present vehicle assembly pallet systems which either were custom made for a single vehicle style or had limited adjustability in a length direction, but were limited to the same locator pin type. The modular reconfigurable assembly pallet 90 can use a standard or universal pallet 12 for all vehicle models and only the modular plates 90 having vehicle (or product) specific riser positions and riser locator members or pins 54 need be fabricated and installed on an as needed basis to support production. This flexibility enables vehicle and other product manufacturers to change model style assembly sequences, for example random, or more random, A,A,A, B,B, A,B,A versus more common batch build sequences A,A,A,A,A,B,B,B,B,B. The present system 90 further provides increased flexibility for semi-permanent plant model changeover or intermittent production changes, for example executing a limited, small quantity test run of vehicles for process validation. Other uses and advantages of the increased flexibility and efficiencies in fabrication are achievable as known by those skilled in the art.

Figure 20:
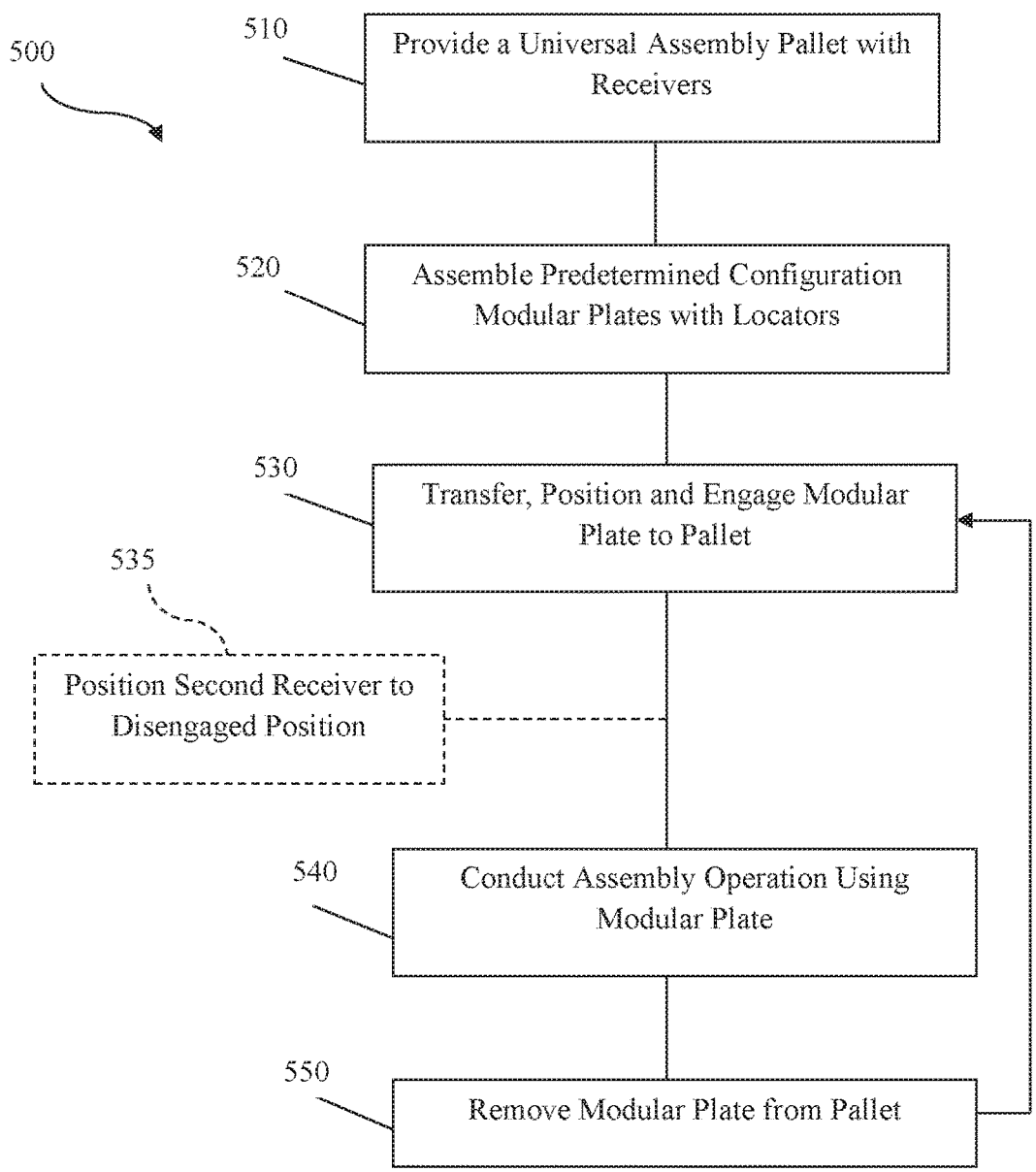
FIG. 20 is a schematic flowchart of an example of a method for reconfiguring an assembly pallet.

Referring to FIG. 20 a flow chart of an exemplary method 500 of providing and using modular reconfigurable pallet system 90 is shown. In an exemplary method of providing a modular reconfigurable vehicle pallet assembly 500, the first step 510 fabricates a standard or universal pallet 12 as described above. This may include one or more fixed support beams 30 and risers 40 described above depending on the product or vehicle model and level of flexibility required by the manufacturer. In one example, a plurality of receivers, for example first 230, second 290 and third 380, are mounted to the pallet 12 in locations to receive the locators mounted to modular plate 94.

In a second step 520, the vehicle-specific support points through risers 40 and locating pins 54 are identified and the number and model of modular plates 94 is identified. The X (22), Y (32) and Z (44) coordinate position or location of risers 40 and locating pins 54 specific to the respective vehicle model is identified. One, or a plurality of, modular plates 94 specific to that vehicle model are fabricated. Positioning and securing the risers 40 and riser locating members 54, preferably pins, relative to plate 94 is preferably made through machined locating pads 34, mounting bolts 50 and locking bolt or dowels 60 as described above. A plurality of plate locators, for example first 112, second 160 and third 200, are connected to each plate 94.

When an assembly pallet 12 is needed for a particular vehicle body, a modular plate 94 having that vehicle model configured riser 40 and riser locating members 54 is in step 530 moved in proximity to the pallet 12 and respective receivers for installation on pallet 12. In one example, a robot 120 and end effector 116 engage the modular plate 94 through transfer pins 430 to engage and support modular plate 94.

In a preferred but optional step 535, prior to full or locking engagement of modular plate 94 to pallet 12, end effector 116 positions a guide 356 to engage a cam roller 150 on a second receiver arm 320 and through movement of the end effector 116 and engaged modular plate 94 along the lateral axis 32, the second receiver arm 320 is moved to a first disengaged position thereby providing clearance for the second locator 160 to be installed in second receiver 290. On retraction of end effector 116 along the lateral axis 32, the cam roller 150 disengages from the guide 356 thereby returning the second receiver arm and locking pin 340 to the second engaged position into the locking aperture 180 in the second locator 160 thereby securing the modular plate 94 in the lateral axis 32 direction relative to the pallet 12.

In step 540, the assembly operation on the particular model of vehicle or product suited for the installed configuration of modular plate 94 is conducted. The assembly operation is repeated using modular plate 94 and pallet 12 until a change in the assembly sequence is ordered or, for example, the modular plate 94 needs to be changed for maintenance or repair.

In step 550, on a need to reconfigure the modular pallet 90 for a different vehicle model, or for maintenance or repair of the modular plate 94, the robot 120 and end effector 116 are positioned to re-engage modular plate 94 thereby moving the second receiver 290 into the second or disengaged position. The modular plate is moved in the lateral axis 32 direction thereby disengaging the locators from the respective receivers to remove the modular plate 94 from the pallet. On a change in the production assembly sequence to a second vehicle model, system 90 installs a second modular plate 94A to the pallet 12 thereby reconfiguring the pallet 12 to accommodate the different product or second vehicle body without having to replace the entire pallet 12 as in prior systems.

The relative ease and efficiency of fabricating the modular plates 94 for specific vehicles, versus dedicating the entire pallet 12 to a specific vehicle, is further improved by the greatly reduced storage of modular plates 94 versus the entire pallet 12 greatly improving plant logistics.

In addition to the substantially increased configuration flexibility, positional dimensional tolerances of the risers 40 and locating pins 54 can be maintained, if not improved, over prior assembly pallet systems.

In an example not shown, modular plate 94 can include vehicle or product model specific tooling other than risers 40 and riser locating members or pins 54 as described and illustrated. For example, modular plate 94 can instead include relatively low profile/height bushing-type locators or other structural locating devices mounted to modular plate 94 which engage a product or vehicle body instead of elongate risers 40 and riser locating members 54.

Further, in an alternate example not shown, other forms of model or product specific tooling may be used on modular plate 94, for example, holding clamps, electrical grounding devices and other structures that are specific to a vehicle or product model that is being assembled. In a similar manner as described above for a modular plate 94 including risers 40, when the vehicle model or product assembly sequence is changed to a new product or vehicle, the model specific modular plate 94 is disengaged, removed and replaced on the pallet 12 or other supporting structure to accommodate the new vehicle model or product to be assembled.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A modular reconfigurable assembly pallet system for use in positioning and supporting a partially assembled product in a predetermined X, Y and Z coordinate position and transferring the product along an assembly line in a X coordinate direction, the modular assembly pallet system comprising:
    a support pallet having a plurality of receivers, the support pallet operable to transport the product along the assembly line in the X coordinate direction;
    a first modular plate configured for the product in a product first configuration;
    a second modular plate configured for the product in a product second configuration different than the product first configuration, each of the first and the second modular plates alternately, selectively and removably engaged with the support pallet and operable to position and support the respective product first configuration and the product second configuration in the predetermined X, Y and Z coordinate position relative to the support pallet, the first and the second modular plates each further comprising:
        a plate having a plurality of support pads; and
        a riser having a fixed locating pin, the riser fixedly connected to the plate in theft predetermined X and Y coordinate position specific to the product in the respective first or the second configuration relative to the plate,
        wherein each plate support pad is selectively and removably engaged with a respective one of the plurality of receivers on engagement of the respective first or the second modular plate to the support pallet, the removably engaged plate support pads and respective receivers operable to position and secure the riser locating pin in the predetermined X, Y and Z coordinate position specific to the product in the respective first or the second configuration relative to the support pallet.

2. The assembly pallet system of claim 1 wherein the plurality of receivers further comprises:
    a first receiver having a plurality of bearing surfaces, each first receiver operable to removably engage a respective one of the plurality of plate support pads to removably position and secure the first or the second modular plates in the X and Z coordinate directions thereby positioning the riser locating pin in the predetermined X and Z coordinate position specific to respective of the product first or second configuration; and
    a second receiver having at least two bearing surfaces, the second receiver further having a locking pin selectively and removably engageable with one of the plurality of plate support pads operable to removably position and secure the first or the second modular plate in the Y and Z coordinate directions thereby positioning the riser locating pin in the predetermined Y and Z coordinate position specific to respective of the product first or second configuration.

3. The assembly pallet system of claim 2 wherein the first receiver further comprises:
    an arm defining a first receiver cavity; and
    a base connected to the support pallet and the arm.

4. The assembly pallet system of claim 2 wherein the second receiver further comprises:
    a base connected to the support pallet; and
    an arm having the locking pin, the arm rotatably connected to the base about a rotational axis, the arm having a first position wherein the locking pin is disengaged from the respective plate support pad and a second position wherein the locking pin is engaged with the respective plate support pad thereby removably positioning and securing the plate in the Y coordinate direction, the base and the arm further defining a second receiver cavity; and
    a cam roller connected to the arm.

5. The assembly pallet system of claim 4 further comprising:
    a programmable multi-axis robot positioned adjacent a conveyor, the conveyor operable to transport the support pallet along the assembly line; and
    an end effector connected to the robot operable to alternately, selectively and releasingly engage the respective first or the second modular plate for installation and removal of the first or the second modular plate from the support pallet.

6. The assembly pallet system of claim 5 wherein the end effector further comprises:
    a first elongate arm;
    a second elongate arm separated from the first elongate arm along the X coordinate direction; and
    a guide connected to one of the first or second elongate arms, the guide operable to position the locking pin in the first disengaged position prior to engagement of plate support pads with the second receiver.

7. The assembly pallet system of claim 5 further comprising a storage rack positioned within a range of movement of the robot, the storage rack operable to support a plurality of the first and the second modular plates, the robot operable to selectively install and remove respective of the first and the second modular plates from the support pallet to support a product build sequence.

8. The assembly pallet system of claim 2 wherein the plurality of receivers further comprises:
    a third receiver positioned opposite the first and the second receivers and having at least one bearing surface, the third receiver operable to further removably position respective of the first or the second modular plates in the Z coordinate direction relative to the support pallet thereby positioning the riser locating pin in the predetermined X, Y and Z coordinate position specific to the product first or the second configuration.

9. The assembly pallet system of claim 2 wherein the plurality of plate locators each comprise:
a base;
an upright connected to the base, the upright further comprising:
an inner surface;
an outer surface;
an upper surface; and
a lower surface.

10. The assembly pallet system of claim 1 wherein the riser comprises two risers, each riser further comprising:
an elongate body extending upward from the plate in the Z coordinate direction, the locating pin positioned at an apex of the body.

11. A method for reconfiguring an assembly pallet for use in the assembly of vehicle bodies, the method comprising the steps of:
providing a support pallet having at least a first and a second receiver;
providing a plurality of plates each having a plurality of plate support pads;
assembling a first modular plate having a riser including a fixed locating pin, the riser fixedly connected to a first plate of the plurality of plates thereby positioning the locating pin in a predetermined X and Y and Z coordinate position specific to a first vehicle model relative to the first plate;
assembling a second modular plate having a riser including a fixed locating pin, the riser fixedly connected to a second plate of the plurality of plates thereby positioning the locating pin in a predetermined X and Y and Z coordinate position specific to a second vehicle model different than the first vehicle model, the predetermined X and Y and Z coordinate position of the locating pin for the first modular plate is different than the second modular plate;
selectively and alternatively moving one of the first or the second modular plates to the support pallet; and
removably engaging the first or the second modular plates to the pallet through removably engaging the plurality of plate support pads with respective of the support pallet first and the second receivers thereby positioning the locating pin in the predetermined X, Y and Z coordinate position specific to the respective first or the second vehicle model.

12. The method of claim 11 further comprising:
disengaging and removing from the support pallet the engaged first modular plate or the second modular plate; and
replacing the disengaged and removed first or second modular plate with the other of the first or the second modular plate to coordinate with a change in a vehicle build sequence from the first vehicle model to the second vehicle model or from the second vehicle model to the first vehicle model.

13. The method of claim 12 further comprising:
storing a plurality of the first modular plates and a plurality of the second modular plates in a storage rack for selected use and engagement with the support pallet to coordinate with the change in the vehicle build sequence.

14. A modular reconfigurable assembly pallet system for use in supporting and transferring a partially assembled vehicle along an assembly line, the assembly pallet comprising:
a universal support pallet;
a first and a second modular plate selectively and removably engaged with the support pallet, the first and second modular plates each further comprising:
a plate;
a riser fixedly connected to the plate in a predetermined X and Y coordinate position specific to a first or a second vehicle model relative to the plate along a X, Y and Z coordinate direction, the predetermined X and Y coordinate position of the riser being different for the first and the second modular plates to respectively coordinate to the first or the second vehicle model, the riser including a fixed locating pin; and
a plurality of plate support pads connected to the plate;
a first receiver connected to the support pallet, the first receiver having an arm defining a first receiver cavity, the first receiver further including at least two bearing surfaces facing the first receiver cavity, each of the at least two bearing surfaces engaging a respective one of the plurality of plate support pads to removably position and secure the respective first or the second modular plate in the X and Z coordinate directions thereby positioning the riser locating pin in the predetermined X and Z coordinate position specific to the respective first or second vehicle model;
a second receiver connected to the pallet, the second receiver further comprising:
an arm defining a second receiver cavity;
at least two bearing surfaces facing the second receiver cavity operable to engage one of the plurality of plate support pads positioned in the second receiver cavity to removably position the plate in the Z coordinate direction; and
a locking pin including a first position wherein the locking pin is disengaged allowing movement of the plate relative to the support platform in the Y coordinate direction and a second position wherein the locking pin is engaged to removably position and secure the plate in the Y coordinate direction, the second receiver and the locking pin operable to position and secure the riser locating pin in the predetermined Y and Z coordinate position specific to the respective first or the second vehicle model.

15. The assembly pallet system of claim 1 wherein the plurality of receivers further comprises:
a first receiver having at least one bearing surface, each first receiver operable to removably engage a respective one of the plurality of plate support pads to removably position the first or the second modular plate riser locating pin in the predetermined X and Z coordinate position relative to the support pallet; and
a second receiver having at least one bearing surface operable to removably engage a respective one of the plurality of plate support pads to removably position the first or the second modular plate riser locator pin in the Y and Z coordinate position relative to the support pallet.

16. The assembly pallet system of claim 15 wherein the second receiver further comprises:
an arm defining a second receiver cavity; and
a base connected to the pallet and the arm.

17. The assembly pallet system of claim 16 further comprising a locking pin connected to the second receiver arm, the locking pin operable to selectively engage the plate support pad to prevent movement of the first or the second modular plate in the Y-coordinate direction relative to the support pallet.

18. The assembly pallet system of claim 15 further comprising a locking pin selectively operable to prevent movement of the first or the second modular plate in the Y-coordinate direction relative to the support pallet.

19. The assembly pallet system of claim 1 further comprising:
- a plurality of plate locators, each plate locator further comprising:
  - a base connected to a respective plate support pad;
  - an upright connected to the base, the upright further comprising:
    - an inner surface;
    - an outer surface;
    - an upper surface; and
    - a lower surface.

* * * * *